(12) United States Patent
Tribble et al.

(10) Patent No.: US 8,209,874 B1
(45) Date of Patent: Jul. 3, 2012

(54) BUILDING FRAME CONSTRUCTION TOOLS AND METHODS USING LASER ALIGNMENT

(75) Inventors: Randy L Tribble, Fruitland, ID (US);
Scott E Moore, Meridian, ID (US);
Michael A Walker, Kuna, ID (US)

(73) Assignee: Tri-Walker, LLC, Fruitland, ID (US)

( * ) Notice: Subject to any disclaimer, the term of this patent is extended or adjusted under 35 U.S.C. 154(b) by 427 days.

(21) Appl. No.: 12/404,262

(22) Filed: Mar. 13, 2009

Related U.S. Application Data

(60) Provisional application No. 61/036,073, filed on Mar. 13, 2008.

(51) Int. Cl.
*G01C 15/00* (2006.01)
*G01C 15/06* (2006.01)
*B43L 7/10* (2006.01)

(52) U.S. Cl. ............... 33/286; 33/293; 33/416; 33/227; 33/DIG. 21

(58) Field of Classification Search ............... 33/290, 33/293, 415–417, 354, 347, 370–375, 379, 33/227, 228, 263, 276, 281, 282, 285, 286, 33/DIG. 16, DIG. 21
See application file for complete search history.

(56) References Cited

U.S. PATENT DOCUMENTS

| | | | | |
|---|---|---|---|---|
| 938,704 A * | 11/1909 | Reum | ............... | 33/416 |
| 1,007,539 A * | 10/1911 | Criss | ............... | 33/417 |
| 1,412,162 A * | 4/1922 | Browning | ............... | 33/417 |
| 2,840,424 A * | 6/1958 | Broderick | ............... | 248/237 |
| 3,378,928 A * | 4/1968 | Hawkins | ............... | 33/416 |
| 4,085,512 A * | 4/1978 | Bod et al. | ............... | 33/293 |
| 4,343,550 A * | 8/1982 | Buckley et al. | ............... | 356/4.01 |
| 4,462,166 A * | 7/1984 | Furlong | ............... | 33/416 |
| 4,598,482 A | 7/1986 | Catleton | | |
| 4,761,890 A | 8/1988 | Morrell | | |
| 4,843,728 A * | 7/1989 | Francis | ............... | 33/640 |
| 5,033,200 A * | 7/1991 | Leung | ............... | 33/485 |
| 5,228,667 A * | 7/1993 | Bridegum | ............... | 269/45 |
| 5,359,782 A | 11/1994 | Langmaid | | |
| 5,419,053 A | 5/1995 | Kathan | | |
| 5,452,522 A | 9/1995 | Kook et al. | | |
| 5,477,621 A * | 12/1995 | Koizumi et al. | ............... | 33/784 |

(Continued)

*Primary Examiner* — Amy Cohen Johnson
(74) *Attorney, Agent, or Firm* — Pedersen and Company, PLLC; Ken J. Pedersen; Barbara S. Pedersen

(57) ABSTRACT

A frame construction tool system, for wood frame buildings, or for metal, polymer, concrete, or composite frame buildings, and methods of using some or all of the tools of said tool system, are particularly well-adapted for roof and/or wall construction. Preferably, a laser light unit comprises a plurality of adjustments for directing the laser light in a variety of directions, preferably for vertical, horizontal, and pivotal adjustment. The laser light unit may be used with targets, cuttings guides, and/or prism units for splitting and/or redirecting the laser beam. In one embodiment, the laser light unit is used with reflective and/or translucent/transparent targets to accurately build a "build-over roof" wherein the laser light unit maps out points and lines of an accurate connection between the roofs. In another embodiment, the laser light unit is used with one or more targets used at the top of a stud wall, to produce a straight line reference from one end/corner of a wall to another. In another embodiment, the laser light unit may be used with a cooperating cutting guide, to measure and properly cut a straight overhang for the roof or a deck and/or to measure and properly cut upending stud members in a pony wall. The preferred laser unit may be used with prism units to layout an entire building.

6 Claims, 25 Drawing Sheets

U.S. PATENT DOCUMENTS

| | | |
|---|---|---|
| 5,539,990 A | 7/1996 | Le |
| 5,713,135 A | 2/1998 | Acopulos |
| 6,052,911 A * | 4/2000 | Davis .................. 33/286 |
| 6,163,969 A | 12/2000 | Jan et al. |
| 6,324,024 B1 * | 11/2001 | Shirai et al. .................. 359/884 |
| 6,710,929 B2 * | 3/2004 | Phuly et al. .................. 359/641 |
| 6,725,555 B1 | 4/2004 | Moore |
| 6,732,439 B1 | 5/2004 | Radke et al. |
| 6,754,969 B2 | 6/2004 | Waibel |
| 6,796,046 B1 | 9/2004 | May |
| 6,820,345 B2 | 11/2004 | Evans |
| 6,820,868 B1 * | 11/2004 | Reymus .................. 269/41 |
| 6,829,834 B1 | 12/2004 | Krantz |
| 6,834,435 B2 | 12/2004 | Turner |
| 6,839,974 B1 | 1/2005 | Hitchcock |
| 6,914,930 B2 | 7/2005 | Raskin et al. |
| 6,964,106 B2 | 11/2005 | Sergyeyenko et al. |
| 7,031,367 B2 | 4/2006 | Marshall et al. |
| 7,082,692 B2 | 8/2006 | Shapiro |
| 7,086,163 B1 * | 8/2006 | Makotinsky .................. 33/286 |
| 7,181,853 B2 | 2/2007 | Heger et al. |
| 7,243,436 B2 | 7/2007 | Casner et al. |
| 7,254,895 B1 * | 8/2007 | O'Donnell .................. 33/293 |
| 7,287,336 B1 | 10/2007 | Goodrich |
| 2003/0051358 A1 | 3/2003 | Kruse |
| 2004/0181955 A1 | 9/2004 | Sargent |
| 2005/0155238 A1 | 7/2005 | Levine et al. |
| 2005/0283987 A1 | 12/2005 | Nash |
| 2006/0059699 A1 | 3/2006 | Krantz et al. |
| 2007/0011896 A1 | 1/2007 | Diaz et al. |
| 2007/0271800 A1 | 11/2007 | Hersey et al. |

* cited by examiner

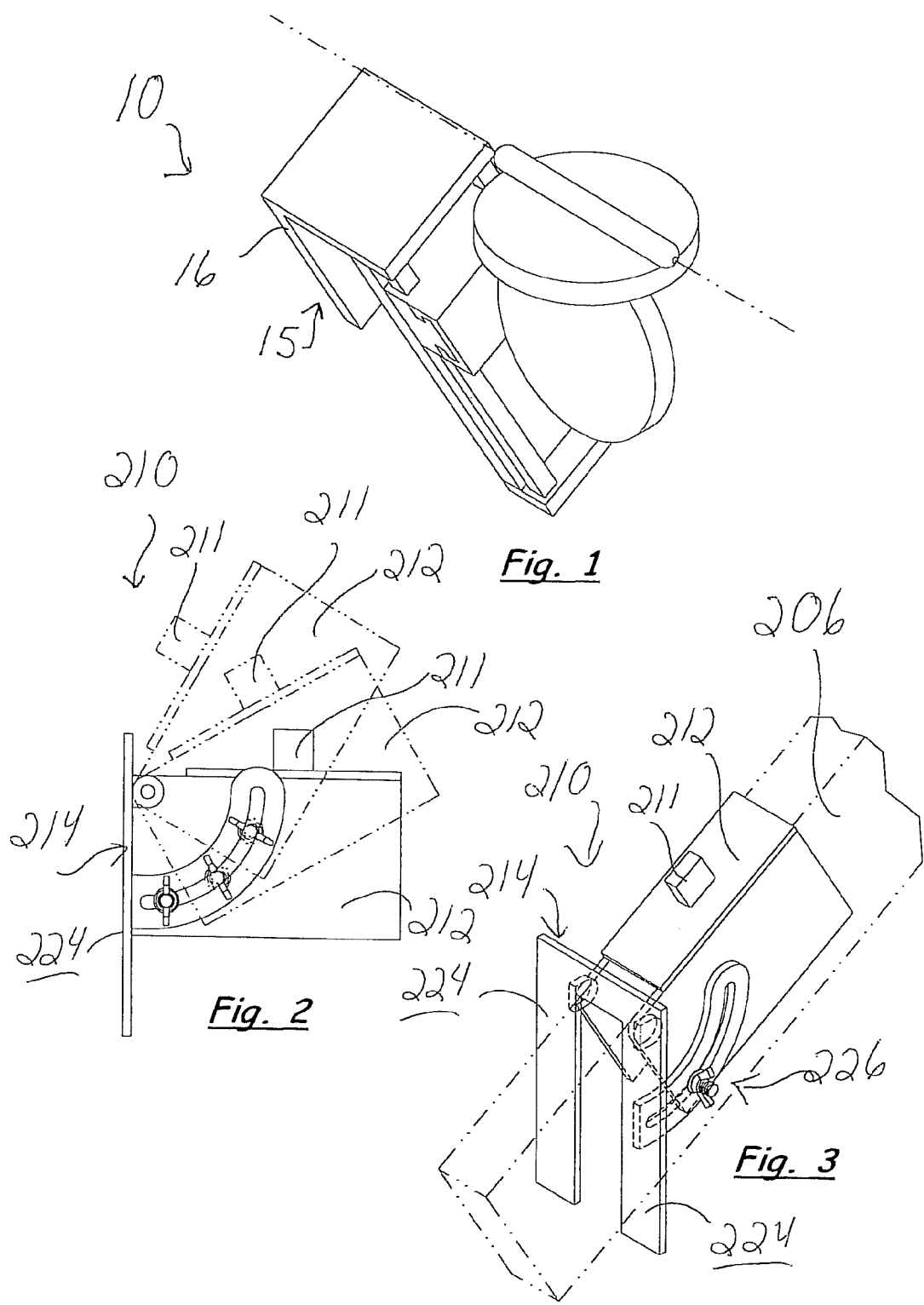

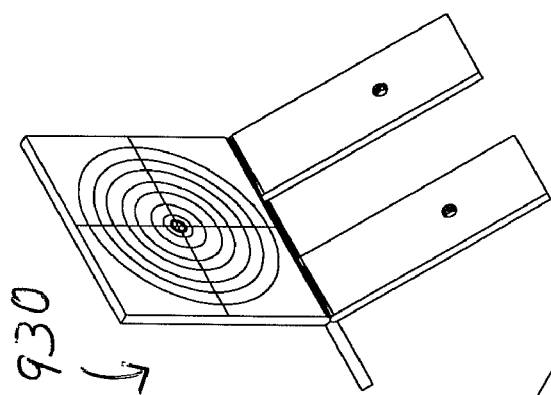
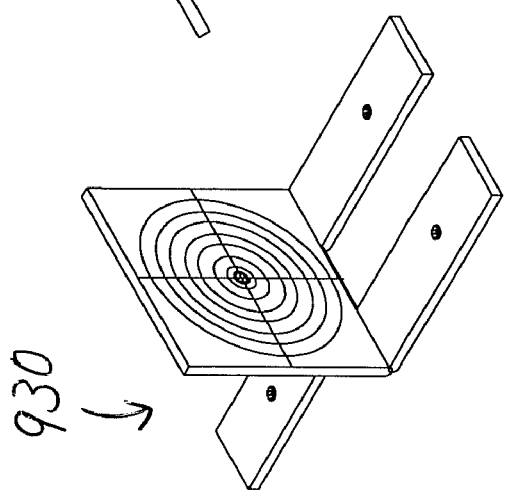
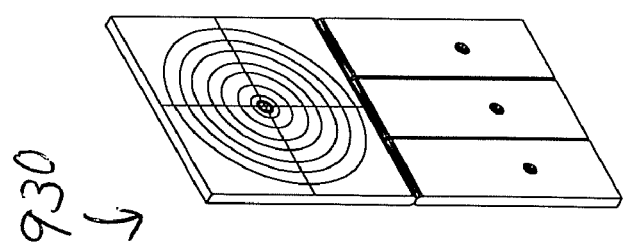
Figure 19C
Figure 19B
Figure 19A

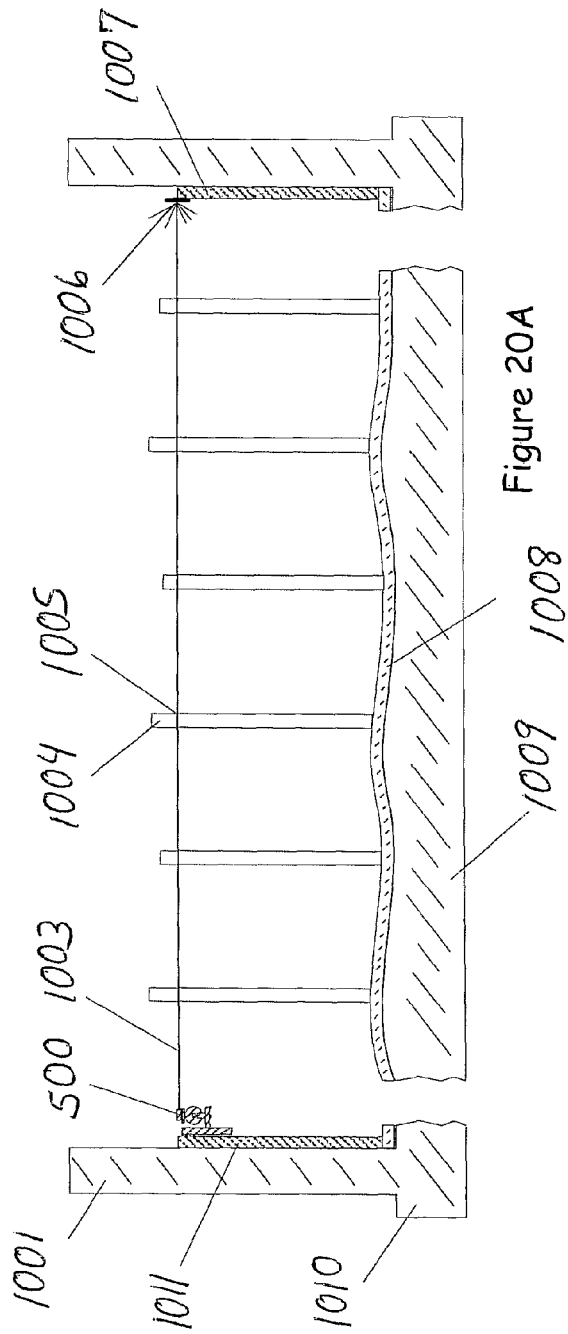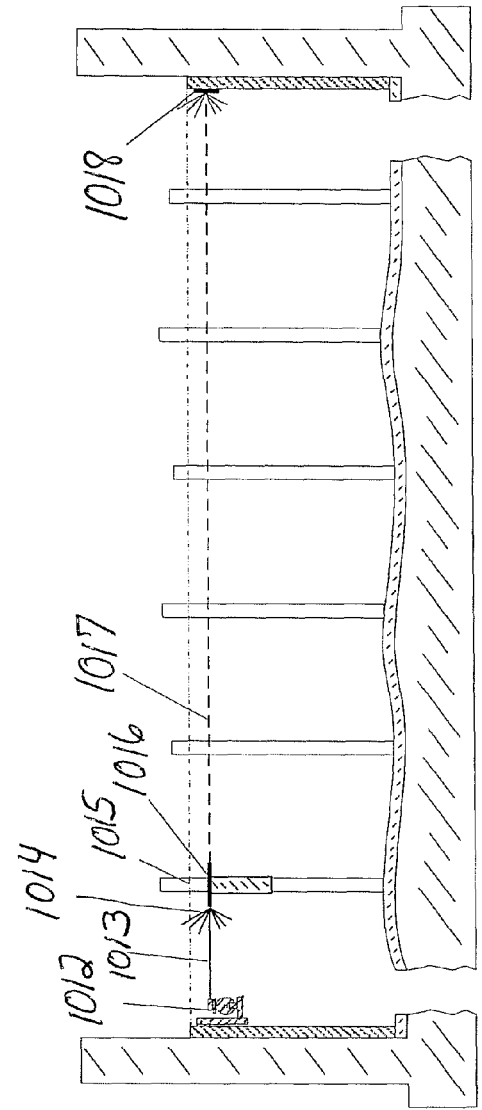

BUILDING FRAME CONSTRUCTION TOOLS AND METHODS USING LASER ALIGNMENT

This application claims priority of Provisional Application Ser. No. 61/036,073, filed Mar. 13, 2008, the entire disclosure of which is incorporated herein by this reference.

BACKGROUND

1. Field of the Invention

The invention relates generally to tools and systems for wood frame building construction, or for other building construction that uses metal, polymer, concrete or composite members in techniques similar to traditional wood frame construction. More specifically, the invention relates to a construction system that comprises a laser light unit that may be used to accurately construct a roof, walls, and other portions of a building. The invented laser light unit may be used, preferably with invented cutting guides and/or targets and/or laser prisms, to replace construction techniques that use chalk and dry lines, rulers and squares, and other conventional tools. For example, the invented apparatus and methods may be used to accurately construct pony walls, and/or to straighten stud frame walls that tend to bend and curve due to their long length. The invented apparatus and methods may be used to accurately set trusses and construct a hip roof or other stepped truss roof. The invented apparatus and methods may be used to accurately connect one roof to another, such as in a roof over-build project. Also, for example, the invented apparatus and methods may be used to cut an accurate roof overhang to result in "non-wavy" fascia. A combination of one or more laser units, prisms, and targets may be used for building layout without chalk or dry lines.

2. Related Art

Laser levels have been designed that utilize the tendency of a laser light to travel a great distance in a straight line. Such levels have been used to indicate a point a great distance from the laser source that is at the same height as the laser source. Such a laser level may be used, for example, to "mark" with light a spot on a distant wall or foundation that is equal in elevation to a reference point on another wall or foundation.

Some laser systems have been developed that emit light in various directions and/or in various planes. The patent literature includes: Jan, et al. U.S. Pat. No. 6,163,969, issued Dec. 26, 2000; Waibel U.S. Pat. No. 6,754,969, issued Jun. 29, 2004; U.S. Pat. No. 6,829,834, issued Dec. 14, 2004; Turner U.S. Pat. No. 6,834,435, issued Dec. 28, 2004; Raskin, et al. U.S. Pat. No. 6,914,930, issued Jul. 5, 2005; Sergyeyenko, et al. U.S. Pat. No. 6,964,106, issued Nov. 15, 2005; Marshall, et al. U.S. Pat. No. 7,031,367, published Apr. 18, 2006; Heger, at al. U.S. Pat. No. 7,181,853, issued Feb. 27, 2007; Goodrich U.S. Pat. No. 7,287,336, issued Oct. 30, 2007; Levine, et al. US2005/0155238, published Jul. 21, 2005; Nash US 2005/0283987, published Dec. 29, 2005; Krantz, et al. U.S. 2006/0059699, published Mar. 23, 2006; and Hersey, et al. US 2007/0271800, published Nov. 29, 2007. Radke, et al U.S. Pat. No. 6,732,439, issued May 11, 2004 discloses a wall-form aligning tool that may be threadably attached to a horizontal platform that is clamped to one corner of a form for pouring of concrete. The Radke, et al. aligning tool may include a laser-emitting device for hitting a target clamped to another corner of the form that is distanced from the aligning tool; the laser is reported to assist in construction of the concrete wall forms in a straight line between said form corners.

Several multi-function tools have been developed, some of which include laser-emitting devices. For example, Hitchcock U.S. Pat. No. 6,839,974, issued Jan. 11, 2005, discloses a "Multi-function Layout Square with Laser" that includes an elongated casing and a protractor plate. The elongated casing is reported to be useable as a level, a plumb bob, a ruler, and a compass. The combined casing and protractor plate tool is reported to be usable as a framing square or rafter square and/or gauge or scribe for straight lines, arcs, or circles. Diaz, et al. US 2007/0011896, published Jan. 18, 2007 discloses a "Multi-Purpose Tool" that comprises two, elongated, parallel "extensions" that are pivotally connected at their ends. The tool is reported to be usable for measuring length, angles, pitch, or a combination of these measurements.

Various tools, comprising elongated, parallel members that are pivotal relative to each other, have been developed that are reported to be usable for roof rafter measurement and/or marking. Kook, et al. U.S. Pat. No. 5,452,522, issued Sep. 26, 1995, discloses a "Calibrated Bevel Square with Integrated Electronic Level and Plumb" that comprises two squares each with two legs or blades 90 degrees apart, wherein a first of the squares does not have a level, and the second of the squares does include an electronic level. The squares are pivotally attached at their vertices by a pivot pin. The tool may be used to measure the inclination of an existing rafter by resting the first square on or under the rafter, and moving the second square relative to the first square until the second square indicates that it is level. The resulting angle between the two squares may be read by referring to indicia on the tool, said angle being indicative of the rafter pitch. Moore U.S. Pat. No. 6,725,555, issued Apr. 27, 2004, discloses a pivoting rafter square for laying out rafters that also comprises two squares, wherein a first square may be laid on or under a rafter and the second square may be pivoted and fixed with its legs horizontal and vertical. The relationship between the two squares may be read from one of the square's indicia that are pointed to by the other square, thus, indicating the pitch of the rafter. May U.S. Pat. No. 6,796,046, issued Sep. 28, 2004, discloses a "Miter Cut, Plumb Cut, and Seat Cut Angle Finding System" that includes two parallel blades that are pivotal relative to each other and wherein the angle between may be read by referring to indicia provided near the pivot point. Casner, et al. U.S. Pat. No. 7,243,436, issued Jul. 17, 2007, discloses a "T-Bevel Plumb Tool" for identifying and placing a plumb line. The tool comprises two parallel blades that are pivotal relative to each other, wherein a first blade may be placed on a rafter, and the second blade, having a level, may be pivoted to plumb. The second blade may be used as a straight-edge for marking a plumb line on the rafter.

To mark or visualize a line, in wood frame construction, between one or more spaced members, or along a long member, common methods of construction use chalk lines and/or dry lines. For example, when a rafter/truss roof overhang is to be cut prior to application of fascia, a chalk line is held and snapped across many rafters, transverse to the length of the rafters. Such a chalk line, if handled expertly and in calm weather, may produce a chalk mark on each rafter that generally indicates the amount of the rafter that should be cut off. Such a chalk line, if handled in-expertly and/or in windy weather, may produce inaccurate, irregular marks, wherein the rafters can end up being cut to different lengths or wherein the builder has to proceed slowly to try to estimate and correct the inaccuracies. Sawing off the ends of rafters based on the chalk line marks, and/or based on a pencil mark from use of a prior art square, can be called an "estimated" saw line at best.

Likewise, a dry line is prone to error and inaccuracy, especially if stretched/pulled a great distance. Using a dry line high up in the air and/or in windy weather, and/or on wet, snow or ice-covered surfaces, can be frustrating, slow, and even more inaccurate than a chalk line.

There is a need for improved tools and/or methods of wood frame construction (and/or for other building frame construction using metal, polymer, concrete, or concrete), to replace methods that mainly utilize chalk lines and dry lines, pencil-marking along squares and rulers, and "estimated" sawing along said chalk lines or pencil-mark lines. There is a need for a system that involves minimum or no estimation when building an overbuild roof. There is a need for a system that can increase the accuracy and speed of roof and/or wall construction, in general, and that does so with a minimum of equipment. As will be described in the following Summary and Detailed Description, the preferred apparatus and methods comprise a laser unit and cooperating tools selected from cutting guides, targets, and/or prisms, depending upon the frame construction application. The preferred embodiments greatly increase the speed and accuracy of pony wall and wall construction, truss setting and hip/stepped-truss roof construction, roof overbuilding, truss tail cutting, and building layout, wherein the invented laser light unit and cooperating accessory items are easily portable and easily usable in a variety of frame construction applications.

SUMMARY OF THE INVENTION

The invention comprises a building frame-construction tool system, and methods of using some or all of the tools of said tool system, for example, for wall and roof construction and/or for building layout. The system preferably comprises a laser light unit that comprises a plurality of adjustments for directing the laser light in a variety of directions, preferably for vertical, horizontal, and pivotal adjustment. The laser light preferably comprises a hook or clamp with a gripping surface for easy installation on a rafter or other frame member, and may comprise rotary and/or linear encoding and display for extremely accurate and convenient operation.

In most embodiments, the laser light unit is used with one or more cutting guide, target, or prism, and does not use chalk or dry lines to accomplish the layout or construction task. In some embodiments, the invented methods may begin by a measuring step to determine the original placement for the laser light unit and/or a target, but after said original placement, the subsequent steps comprise adjusting the location and direction of the laser beam source to point to, or outline, locations wherein frame members are to be attached or otherwise constructed.

In some embodiments, the laser light unit is used in combination with at least one target that is preferably at least partly transparent for allowing the laser light to hit the target if the laser and the target are appropriately aligned. For example, at the top of a stud wall, the laser light unit is used to produce a straight-line light reference that can travel from one end/corner of a wall to another. Target(s) upend from portions of the wall to indicate when the particular target and, hence, its respective wall portion, is aligned with the laser and is therefore straight. Multiple transparent or translucent targets may be provided on the wall at the same time, as each wall portion is pushed into alignment with the laser light, the laser light passes through and past the target for alignment of the next wall portion. A single laser light, therefore, may indicate how curved/wavy the wall is, and also provides a straight reference line so that the "wavy" sections of the stud frame wall may be straightened.

The laser light unit may be used with laser targets for accurately setting trusses and for building complex roof shapes, for example, a hip roof or other stepped truss constructions, "build-over roof" or "roof overbuilds." Further, the laser light unit may cooperate with a cutting guide, to measure and properly cut a straight overhang for the roof or for a deck. The cutting guide comprises a rafter cover/hook attachment element for retaining the guide on the rafter, and a pivotal guide plate, preferably with bubble level or sensor and angle markings, that may be pivoted to, and fixed at, an appropriate angle for each roof pitch. The guide plate preferably comprises at least one, and preferably two transverse support surfaces (one for being on each side of the rafter), which provide a sufficiently-large surface area on a vertical (plumb) plane that is generally transverse to the rafter length. Said preferred transverse support surfaces serve as flat saw guide platform(s) for cutting the rafter end parallel to the platform surfaces, to make the rafter end accurately plumb and accurately perpendicular to the side surfaces of the rafter. Said cutting guide may comprise a light-reflective slot, edge, or other element for cooperating with the laser.

Other features and objects of the preferred embodiments of the invention will become clear to readers of the following Detailed Description of the Preferred Embodiments and to viewers of the Figures.

BRIEF DESCRIPTION OF THE DRAWINGS

FIG. 1 is a schematic perspective view of one embodiment of the invented laser light unit, wherein the laser light is tilted slightly, using an optional tilt connection, relative to its rafter/beam-attachment hook.

FIG. 2 is a side view of one embodiment of the invented cutting guide, illustrating in dashed lines how the rafter cover and guide plate may be pivoted relative to each other to accommodate various roof pitches. In this figure, the rafter cover of the cutting guide resides at various angles relative to vertical, representing different roof pitches, while the guide plate remains vertical for cutting of the rafter end.

FIG. 3 is a perspective view of the embodiment of FIG. 2, shown on a rafter with the guide plate pivoted and locked in a position that will allow cutting of the end of the rafter in a plane that will be exactly vertical.

In FIG. 9, the laser light unit of FIGS. 1, 4-8 is in use determining proper placement of the ridge beam that extends from the lower roof to the main roof. While this figure illustrates rafters 113 already in place, it may be understood that rafters 113 are not installed until after the ridge beam (at location 120) is installed.

In FIG. 12, a target is shown in one location along the top of the wall being straightened, but it will be understood from the Figures and this Disclosure that multiple targets may be provided along the entire length of the wall, and/or a single target may be moved along the length of the wall as various portions of the wall are straightened and secured. While the laser light may be visible on the top surface of the wall, depending on the orientation of the laser light to said top surface, it is preferred that targets upend from the wall top surface so as to be easily struck by a laser-light line that is parallel to said top surface.

FIGS. 19A-C are perspective views of an alternative embodiment of the invented laser target, featuring an alternative lower target portion for additional options for connection of the target to a surface or surfaces.

FIGS. 20A and B are side views of methods of using the especially-preferred laser light unit embodiment of FIG. 14, preferably used with targets and a cutting guide according to embodiments of the invention, to accurately build a pony wall.

DETAILED DESCRIPTION OF THE PREFERRED EMBODIMENTS

Figure 5:
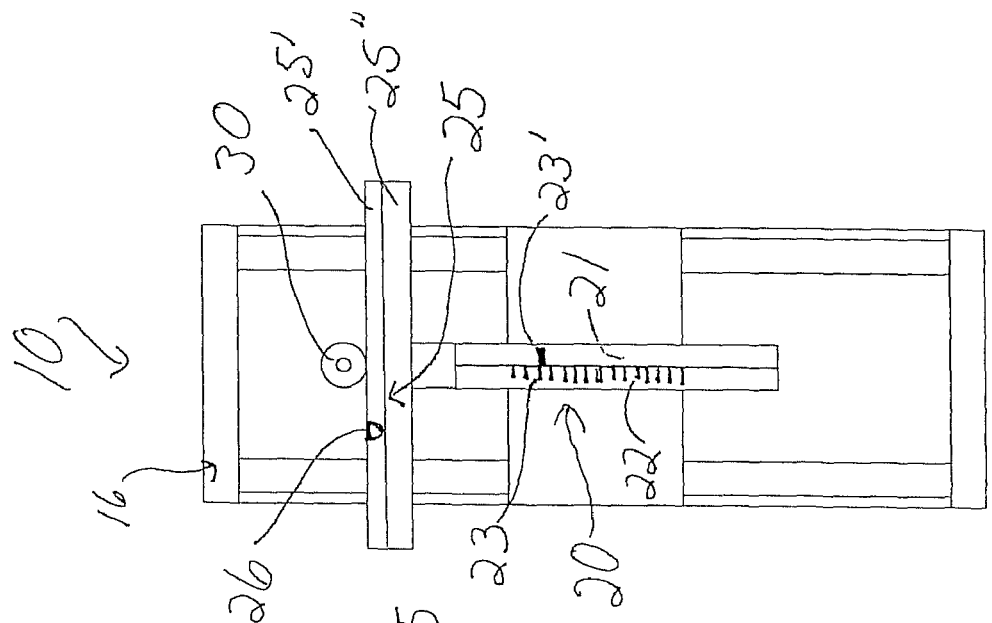
FIG. 5 is a front view of the laser light unit of FIGS. 1 and 4.
Figure 4:
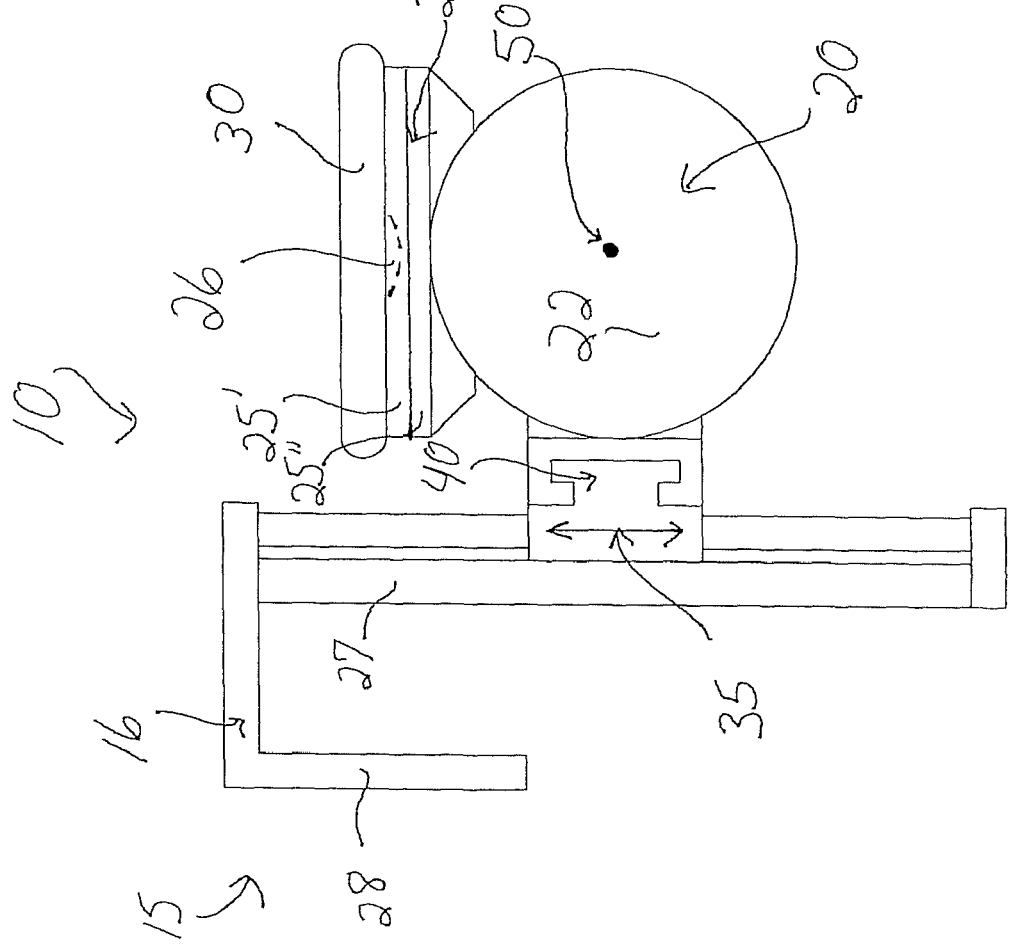
FIG. 4 is a side view of the laser light unit of FIG. 1.

Referring to the Figures, there are shown several, but not the only, embodiments of the invented system of frame construction tools and/or methods. The invented system of tools and methods is preferably used for wood frame construction, and is therefore described in detail herein with reference to wood members, but it should be understood that the invented tools and methods may be used and/or adapted for other frame construction, such as construction using metal, polymer, concrete, or composite studs, rafters, and other members. FIGS. 1-13 schematically illustrate some but not the only embodiments of the invented tools and methods, including a laser light unit 10 and a cutting guide 210 in use in various wood frame construction applications. FIG. 14 illustrates an especially-preferred embodiment of the invented laser light unit 500, and FIGS. 15A and B, 16A and B, and 17A and B illustrate especially-preferred embodiments of cutting guides 600, 700, and 800, and FIGS. 18A and B and 19A-C illustrate some but not the only embodiments of the invented laser targets 900 and 920. Especially-preferred embodiments of the invented methods for using the tools are shown in FIGS. 20A and B, and 21-24. One, but not the only embodiment, of a laser prism assembly 1600, and methods of mounting and using the prism assembly, are portrayed in FIGS. 25-27. One, but not the only embodiment, of each of a rotary encoder and a linear encoder, with readout, are portrayed in FIGS. 28 and 29, respectively, wherein the rotary and linear encoders may be used as the adjustment joints in some embodiments of the invented laser light unit.

Referring Specifically to FIGS. 1-13:

The preferred tools and methods comprise at least one laser light unit or at least one cutting guide, or may comprise methods of using at least one of the laser light unit or cutting guide. The preferred system comprises laser light unit 10, which may be used for various methods of roof and wall construction. The preferred system may also comprise a cutting guide 210, used alone or in combination with the laser light unit 10.

The preferred laser light unit 10 comprises a system for installing the laser light unit 10 onto a rafter, a 2×4, or another member, for example, as illustrated in FIGS. 6-13. The preferred system for installing is a hook system 15 having a hook member 16 that may be a U-shaped or other hook-shape sized and shaped to preferably hang snugly (or optionally be adjustable to be snug) on the rafter or other member. Connected to the hook member 16 is a dual-plate system 20, wherein a first plate 21 and a second plate 22 are preferably parallel and coaxial with each other and may be of the same diameter, and may be connected at adjustable connection 50.

Said first plate 21 may rotate relative to the second plate 22 on their common axis, to pivot the platform 25 upwards to or beyond horizontal, or down various amounts to various "pivoted" positions. The platform 25 is rigidly connected to the first plate 21 so that rotating plate 21 will pivot platform 25 to a degree/pitch that may be indicated by indicia 23, 23' on the plates 21, 22.

Upon the platform 25 is attached a laser light 30, which may be removable for easy change to different laser types and/or configurations. The laser light 30 may comprise batteries sufficient to power the laser light for many hours or may be adapted to be powered by an external power source. Laser light 30 preferably is designed to emit light that is visible for at least 50 feet, and preferably up to about 200 feet so that it is effective in building especially long wall and long roof buildings. The laser light is preferably a green laser, but may be other types. At or near the laser light 30 is provided a level device, such as a traditional "bubble" level 26 that is provided in the platform 25, which may comprise a spot, line, or crosshair pattern for leveling in one or more directions.

The connection between the light unit and the hook system preferably comprises multiple adjustments to allow adjustment of the position of the emitted light in at least three directions. Preferably, the laser light may be raised and lowered, moved transversely, and pivoted forward-to-rearward, and optionally, tilted side-to-side. This adjustability may be accomplished, for example, by a slidable and lockable connection 35 that allows the dual-plate system 20, and, hence, the laser light on platform 25, to move up and down relative to the hook member 16. Because hook member 16 typically and preferably is received on a rafter R so that plates 27, 28 are vertical, the dual-plate system 20, platform 25 and the laser light provided on or in said platform will typically and preferably move vertically up and down at adjustable connection 35.

The connection between the laser light and hook system preferably comprises a transversely-slidable and lockable connection 40. This allows the dual-plate system 20, and, hence, the laser light on platform 25 to move left and right relative to the hook member 16 (and, hence, relative to plates 27, 28). Because hook member 16 typically and preferably is received on a rafter R so that plates 27, 28 are vertical, the dual-plate system 20, platform 25 and the laser light provided on or in the said platform will typically and preferably move horizontally (directions into and out of the paper in FIG. 4), parallel to the surface of the rafter R upon which it is hooked.

The connection between the laser light and hook system comprises a pivotal connection 50. This allows plate 21, as discussed above, to pivot the platform 25 and laser light 30 on the axis at 50, for example, upward/rearward above horizontal (to emit light higher than horizontal) and downward/forward below horizontal (to emit light lower than horizontal). The downward/forward pivoting, for example, allows the light to be emitted lower than horizontal, as portrayed in FIG. 7, which may be particularly beneficial for roof construction. Preferably, the pivotal connection 50 will pivot the laser light 30 at least 50 degrees, and preferably at least 90 degrees.

Optionally, another pivotal connection may be included to allow the platform 25 and light 30 to tilt to the right and left (into and out of the paper in FIG. 4), preferably by means of the dual plate system 20 being pivotally connected to the hook system 15. Further, preferably the platform 25 is also a dual-plate system (plates 25', 25") that allows the top plate 25' to rotate relative to lower plate 25", for rotating the light 30 to point various directions in a plane parallel to the planes of plates 25', 25".

The laser light is preferably designed to emit an intense/visible laser line 31 of light in a straight line, so that, even many feet distant from the light 30, a "point" of light that is strong and accurate and focused hits the surface being aimed at. For example, commercially-available lasers may be used, preferably of the type that can emit a strong, intense laser light line many feet. Optionally, a laser capable of emitting of light accurately in a plane(s), rather than in a line, may be used, or the laser light may be switched between the two. For example, a laser than emits a planar (substantially two-dimensional) beam rather than a linear beam (substantially one-dimensional) may be used for some applications.

Laser light unit 10 may be used in multiple methods of frame construction. For example, see FIGS. 6-12, and the discussion that follows.

Figure 9:
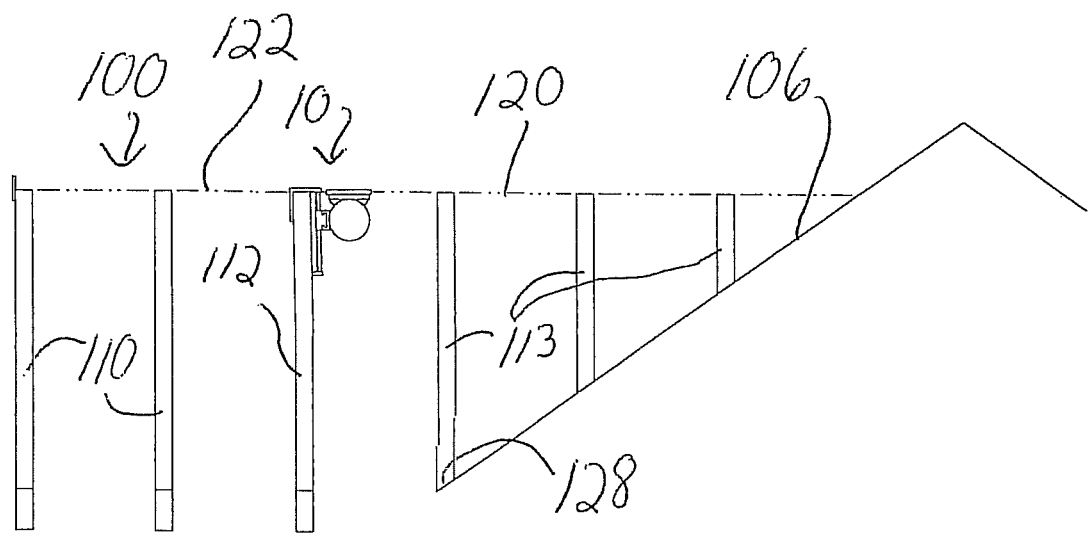
FIG. 9 is a schematic side view of a roof overbuild project, wherein a smaller, and typically lower, roof is built to abut into the sloped side of a larger main roof.
Figure 10:
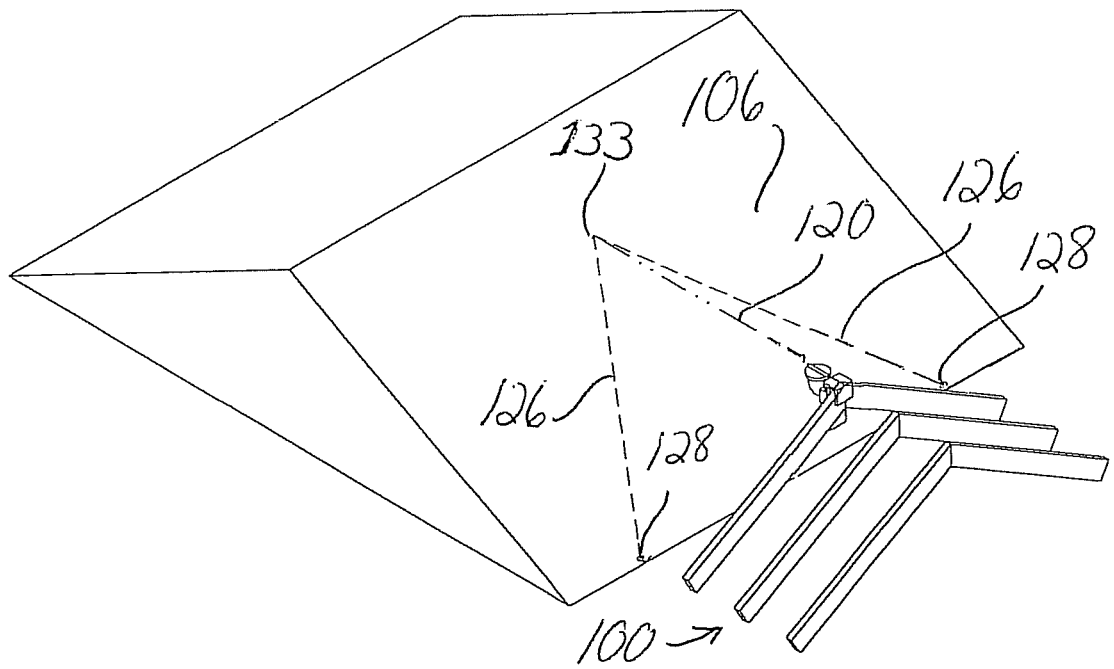
FIG. 10 is a schematic perspective view of the roof overbuild project of FIG. 9, wherein rafters 113 (see FIG. 9) and the ridge beam (at location 120) are not yet installed. The laser light unit is portrayed in use to determine the accurate/proper point of attachment of the ridge beam to the main roof and also to determine the accurate/proper lines for the valleys (126) wherein the lower roof joins the main roof.

A roof construction that is difficult to do accurately is an "overbuild" of a lower roof that connects to a main roof of a typically-larger and taller main building, wherein the lower roof is non-parallel to the main roof in that the ridge beam of the lower roof is non-parallel to the ridge beam of the main roof. One example of such a roof overbuild is shown in FIGS. 9 and 10. Typically, roof 100 is perpendicular to the main roof 106. Rafters 110, 112 are provided for roof 100, leaving a large gap between the rafter 112 (closest to the main roof 106 prior to installation of rafters 113) and the main roof 106. Typically, the rafters 110, 112 are installed while main roof 106 is still only covered by plywood or other wood sheets, and, before the final roofing steps of applying shingles or other outer roof layers, the large gap must be filled with a ridge beam (not drawn in FIGS. 9 and 10, but understood to be installed at location 120), and additional shorter rafters 113 extending down from the ridge beam (120) to the main roof 106. As may be understood from FIGS. 9 and 10, the shorter rafters 113 will extend in vertical planes to connect at their ends to the main roof 106, thus, creating "valleys" (at locations 126 in FIG. 10) on each side of the ridge beam (120) representing the connection between roof 100 and roof 106. Each valley may be represented by line 126 from the end of the ridge beam (at 120), slanted down and out along the main roof 106 to right and left points 128 represented by the end of the first of rafters 113 that will contact the main roof 106.

Conventional methods for constructing such an overbuild tend not to be accurate, and vary depending upon the skill and experience of the builders. The conventional methods are, at best, slow, and, at worst slow and inaccurate, as will be further discussed later in this document regarding FIG. 23.

Further referring to FIGS. 9 and 10, the laser light unit 10 may be hung from rafter 112, with the hook 16 preferably centered on the rafter 112 so that the laser light 30 is parallel to the longitudinal axis or the ridge (represented by line 122) of the roof 100. Any and all of the adjustable connections 35, 40, 50 are adjusted, if necessary, to center the laser light 30 on the longitudinal axis 122 of the roof ridge, so that the emitted light from light 30 is collinear with the longitudinal axis 122 of the roof. The emitted light travels straight to hit the side of main roof 106 at point 133, which may be easily marked by paint or another marker. After removal of the laser unit 10, a ridge beam (at location 120) may then be easily installed between the ridge line of rafter 112 and point 133, and this installation results in the ridge beam (at 120) being perfectly or nearly perfectly horizontal. The installation of the ridge beam may be done by conventional nailing or other conventional methods, without the need for further leveling or measuring, and without estimating or trial and error. This is a significant benefit considering the difficulty of leveling and measuring across the large gap, which gap is high in the air.

Figure 7:
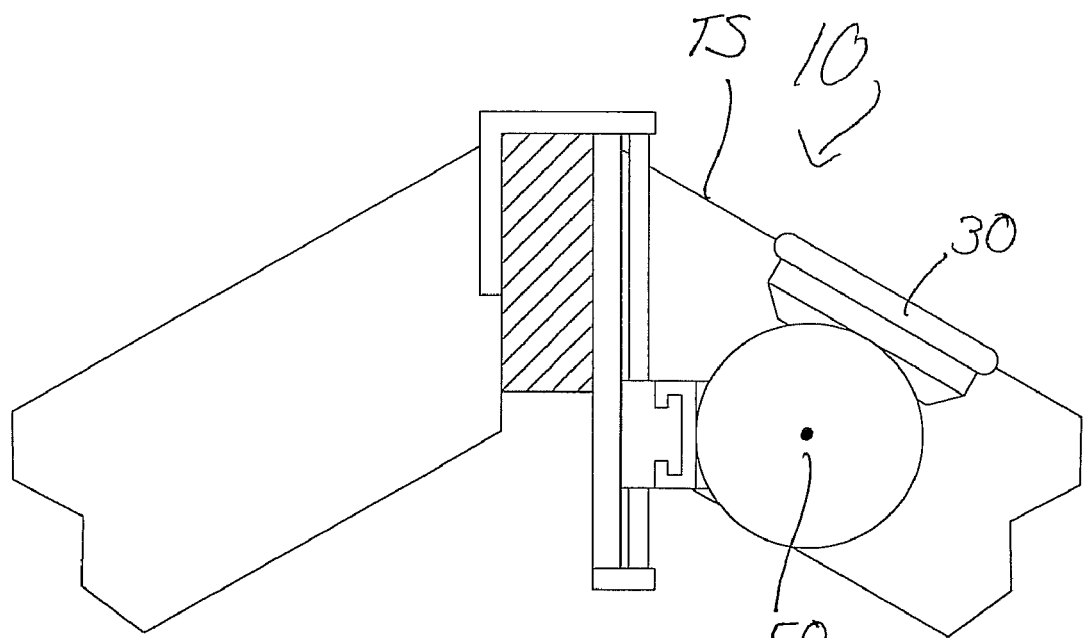
FIG. 7 is a side view, with a roof ridge beam shown in cross-section, of the laser light unit installed on said roof ridge beam and the laser light pivoted downward (using connection 50) so that the laser shines in a line that is parallel to the length of the rafter(s) and that is on the same plane as the top surface (TS) of the rafter(s). The laser light unit, thus arranged and adjusted, may allow the builder to shine the laser on (and thus, indicate for subsequent marking by pencil, paint, or marker) a spot that is exactly on said plane (of rafter top surface TS) and parallel to the longitudinal dimension of the rafter(s), for example, to accurately set rafter pitch and/or to accurately indicate wherein rafter ends should contact and be attached to another structure. This type of operation may be used, for example, in an overbuild roof construction, such as described later in this document for FIGS. 9 and 10, wherein the laser unit 10 may be used in a configuration similar to that in FIG. 7 to laser-point at the valleys where rafters 113 connect to roof 106.

Laser light unit 10 is preferably also used to point out the exact lines of valleys 126, and, thus, the exact points at which the ends of rafters 113 should connect to roof 106. This may be done by moving the laser light unit 10 along the newly-installed ridge beam (at 120), and pivoting the laser via connection 50 to the exact roof pitch desired (for example, as shown in FIG. 7). The builder may mark points on line 126 or an entire line 126, as the laser is pointing to said points or line 126, for exact determination of the required length of rafters 113 and the exact placement and connection of rafters 113 to the roof 106.

Another construction method in which the laser light unit 10 is particularly beneficial is establishing a proper overhang for roof rafters before the fascia may be installed on the ends of the rafters. The rafters, when manufactured or built, are typically longer than desired and have end surfaces that are not plumb (not vertical). Also, the rafters may not be of consistent length. Therefore, the rafter ends should accurately be cut to plumb and to the same length, but this is difficult with conventional methods; chalk-line-marked and hand-cut rafter ends typically result in wavy fascia, especially along a long roof.

Figure 8:
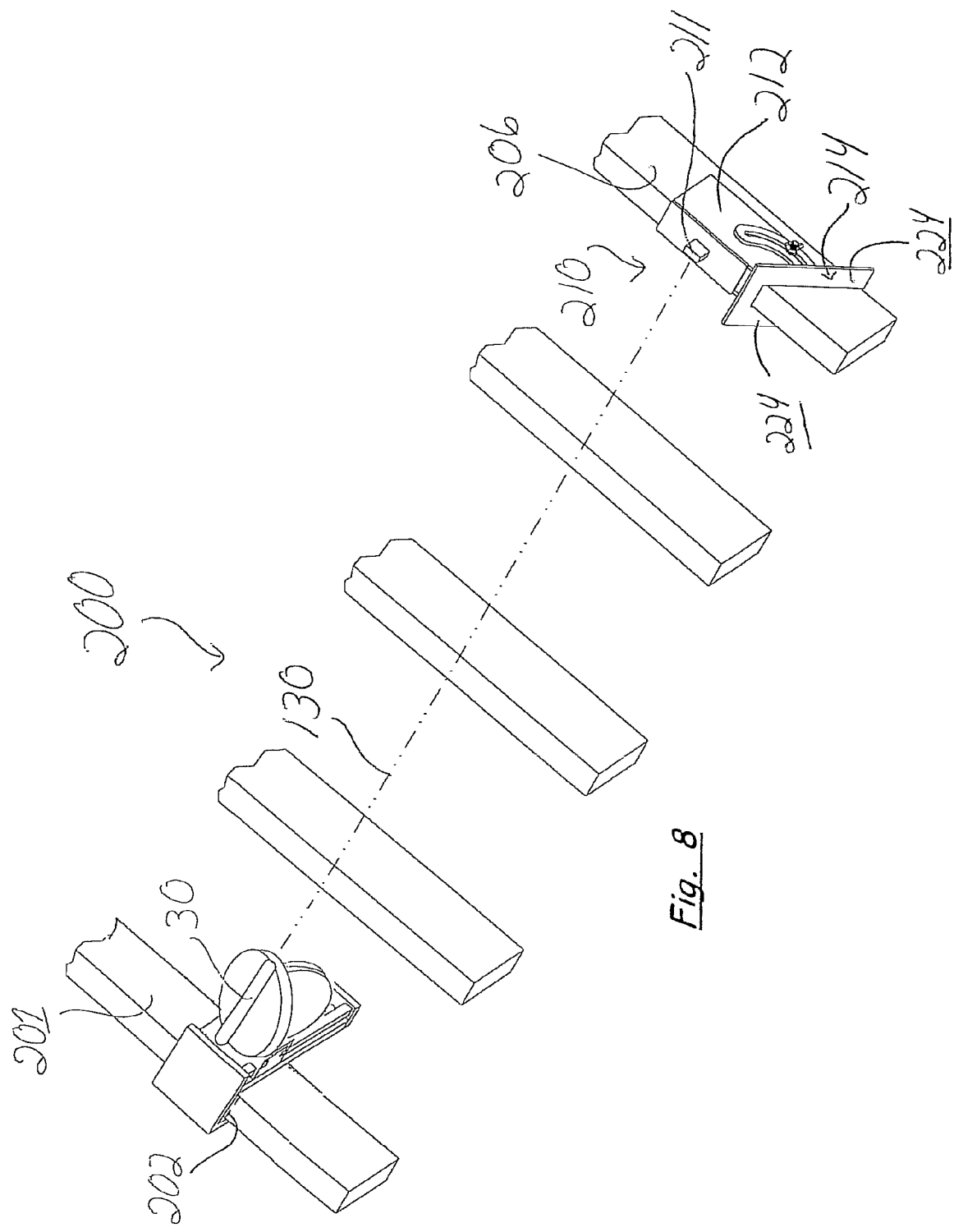
FIG. 8 is a portrayal of multiple rafters of a roof, wherein the cutting guide 210 is adjusted on a given rafter until the laser light of unit 10 points to the marker/tab 211 of the cutting guide. The guide plate is pivoted and locked relative to the rafter cover of the cutting guide, for example, in advance of starting the rafter cutting process, so that sawing along the guide plate will result in a properly cut, plumb end surface of the rafter.

Referring especially to FIG. 8, in order to provide superior rafter end cuts and non-wavy fascia, laser light unit 10 is hooked on first rafter 201 at a far end of the roof 200, for example, with the edge of the hook 16 on previously-marked line 202. This should be done with the light 30 adjusted into a known position (for example, centered using connection 40 as in FIG. 8), or other known position for which the light unit 10 has been calibrated for use in this rafter-end cutting method.

If the builder knows that a particular overhang is required, the builder will be able to determine where the rafter end should be cut, and, based on the dimensions of the laser light unit 10 and guide 210, the builder will know from what location the laser should shine and where he should make mark 202. Light 30 will shine so that hitting the target tab 211 on guide 210 will indicate that guide 210 is properly placed on rafter 206 and that cutting along guide plate 214 will cut rafter 206 to the desired and proper length.

One or more of the adjustable connections of unit 10 may be employed (up and down, transverse sliding, pivoting, or optional tilting adjustment) to point the laser light 30 preferably so that the emitted light 130 shines across all of the top surfaces of the other rafters, all along that side of the roof, preferably about an inch or less above the top surfaces of the rafters 202, and these adjustments, if necessary, will be decided and designed in advance so that the light position relative to the unit 10 and the guide 210 is set to produce repeatable and accurate results.

With the laser light unit 10 in place at one end of the roof, the guide 210 may be moved from rafter to rafter, with the light hitting the target tab 211 each time, and with the builder cutting each rafter end off at the plate 214. The light 30 will shine all the way to the opposite end of the roof 200, creating a line of light that is straight and perpendicular to rafter 201, and/or hitting a reflective target placed on the last rafter, and that is a predetermined distance from the desired end of the rafter (and, it will be understood the same predetermined distance from the plate 214), that is, from the plane at which the rafter should be cut to result in the desired overhang.

The guide 210 comprises rafter cover 212 and guide plate 214, which are pivotally connected to each other and which may be locked relative to each other by various locks, for example, lock 226. Rafter cover 212 has preferably generally a U-shaped body that is sized and shaped to fit snugly, but not tightly, over a rafter. Or, as discussed later in this disclosure, the rafter cover may be an L-shaped body that is single-hand-clamped to the rafter with a quick-clamp device. The snug, but not tight, fit allows the cover 212 to be set on a rafter without wobbling or twisting, but also without the user having to struggle to install or remove the cover 212 from the rafter. The cover 212 has an upwardly-extending tab 211, a stripe, or other marked spot upending from or along its top surface, which indicates a point on the cover 212 that should be aligned with the emitted light of the laser 30, as discussed above.

The geometries of the light unit 10 and the cutting guide 210 result in the following structure and circumstances: light is emitted in a straight line from a position on the laser unit 10 that is in a know position on the first rafter 201 (calculated from the desired overhang and the known dimensions of laser light unit 10 and guide 210). The builder may measure and pencil-mark said first rafter 201 (for example, at 202) and typically also measures and marks the last rafter and attaches a reflective target to the last rafter, so that he knows the where to place unit 10 and where the laser is to be aimed. Then, guide 210 is positioned on each rafter in succession so that the tab 211 is hit by the light 130. The guide plate 214 is pivotal relative to the cover 212 and may be set and locked (by means of lock 226 or other lock systems) in a position that puts it in a plate plane that is parallel to and adjacent to the plane of the desired cut, for example, 1-1.5 inches from the plane of the desired cut for typical hand-held construction-grade saws having their blade 1-1.5 inches from their saw "foot-plate" (as the saw's plate-like support extension is commonly called, illustrated by the saw in U.S. Design Pat. D567,612, for example, the illustrations of which are hereby incorporated by this reference). The saw table is place on and slid along the guide plate 214, and the blade cuts the rafter at said 1-1.5 inch from the guide plate 214. In other words, the front surface 224 of the plate 214 serves as a platform for receiving the support extension of a hand-held saw, whereby the user rests the support extension against the plate 214 and cuts through the rafter, resulting in an accurate and excellent cut. Note that the plate 214 extends along the top of the rafter 206 and down along both sides of the rafter 206, giving a stable and sturdy plate structure and also so that a right-handed or left-handed builder may conveniently use the guide 210. See FIGS. 2, 3, and 8.

Figure 11:
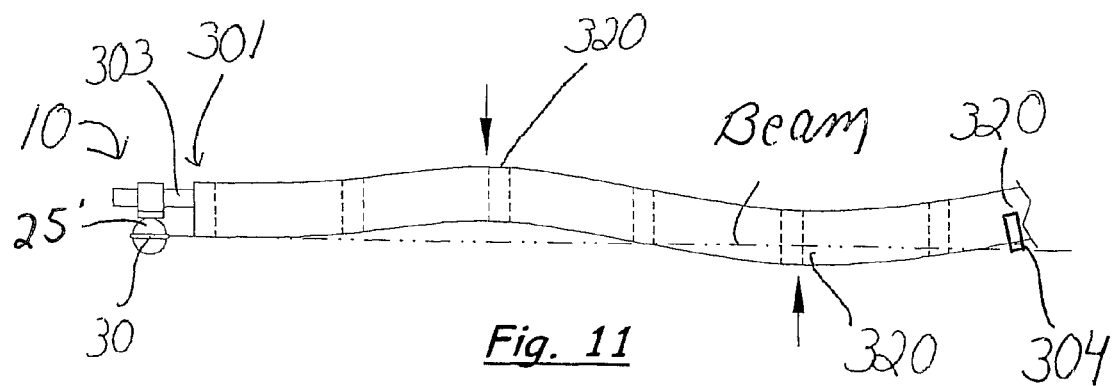
FIGS. 11 and 12 are a top view, and a side view, respectively, of the laser light unit of FIGS. 1, 4-10 in use on the top of a stud frame wall, wherein the laser light emits a straight-line light that is used to guide the builders to push (and secure) wavy portions of the wall into straight alignment to create a straight wall.
Figure 12:
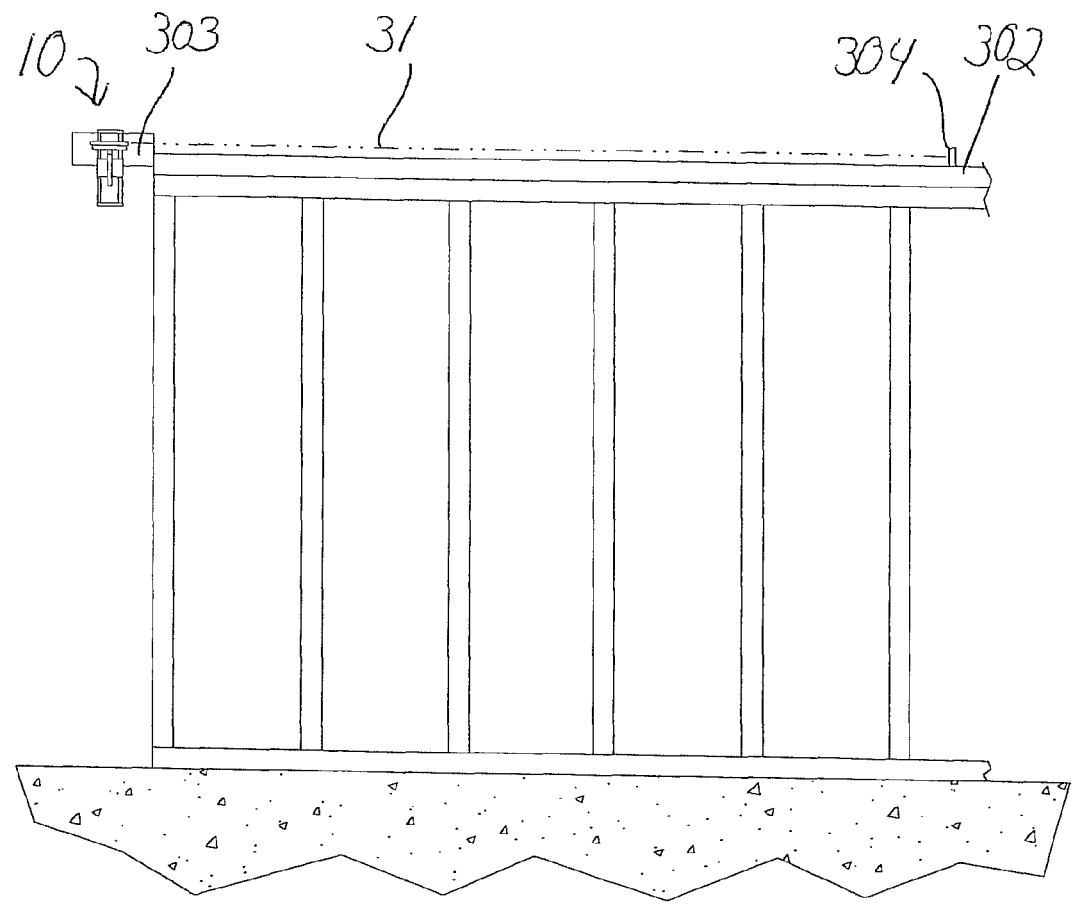
Figure 13:
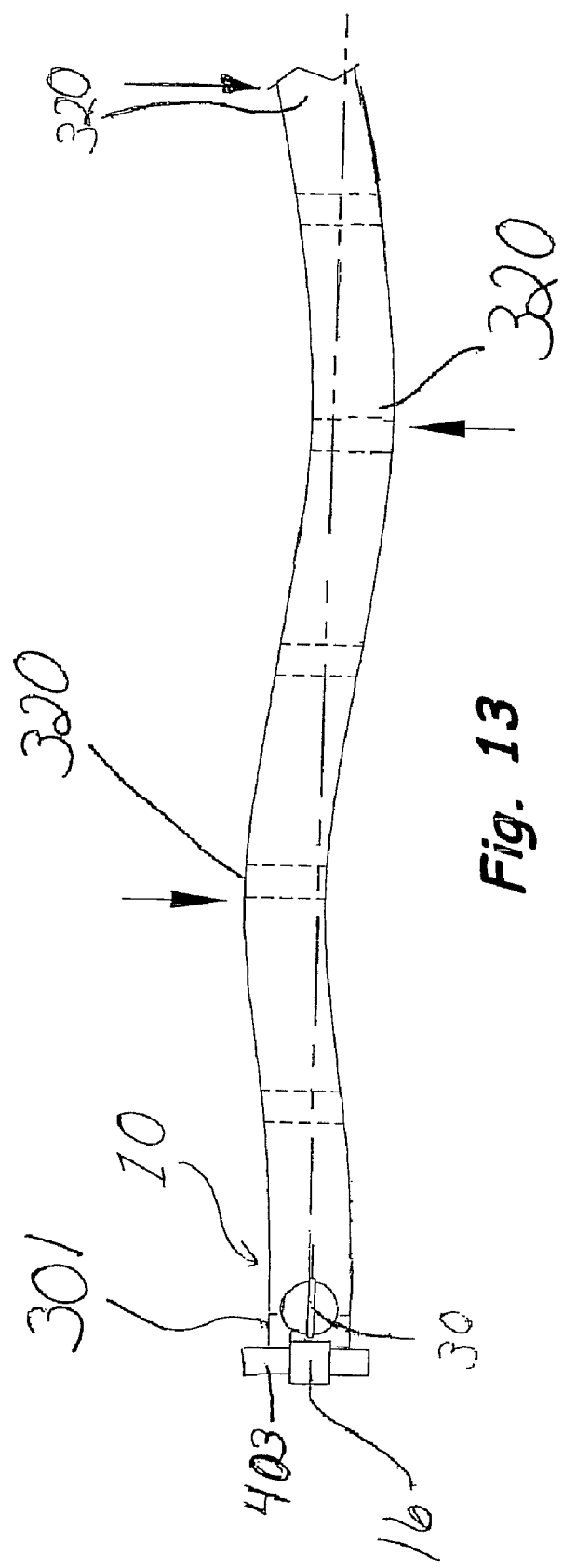
FIG. 13 illustrates a top view of an alternative orientation for the laser light unit for straightening a stud frame wall. The support plate/block on which the laser light unit is hooked is oriented 90 degrees from its position in FIGS. 11 and 12 and centered so that the laser light emits a straight line light that preferably shines along the center of the wall. The orientation in FIG. 13 may better guide the builder regarding how far and where to push (and secure) wavy portions of the wall into straight alignment to create a straight wall. While no targets are shown in FIG. 13, it will be understood from further discussion and drawings later in this Disclosure that one or more targets may be used along the wall, especially if multiple "waves" exist in the un-straightened wall.
Figure 14:
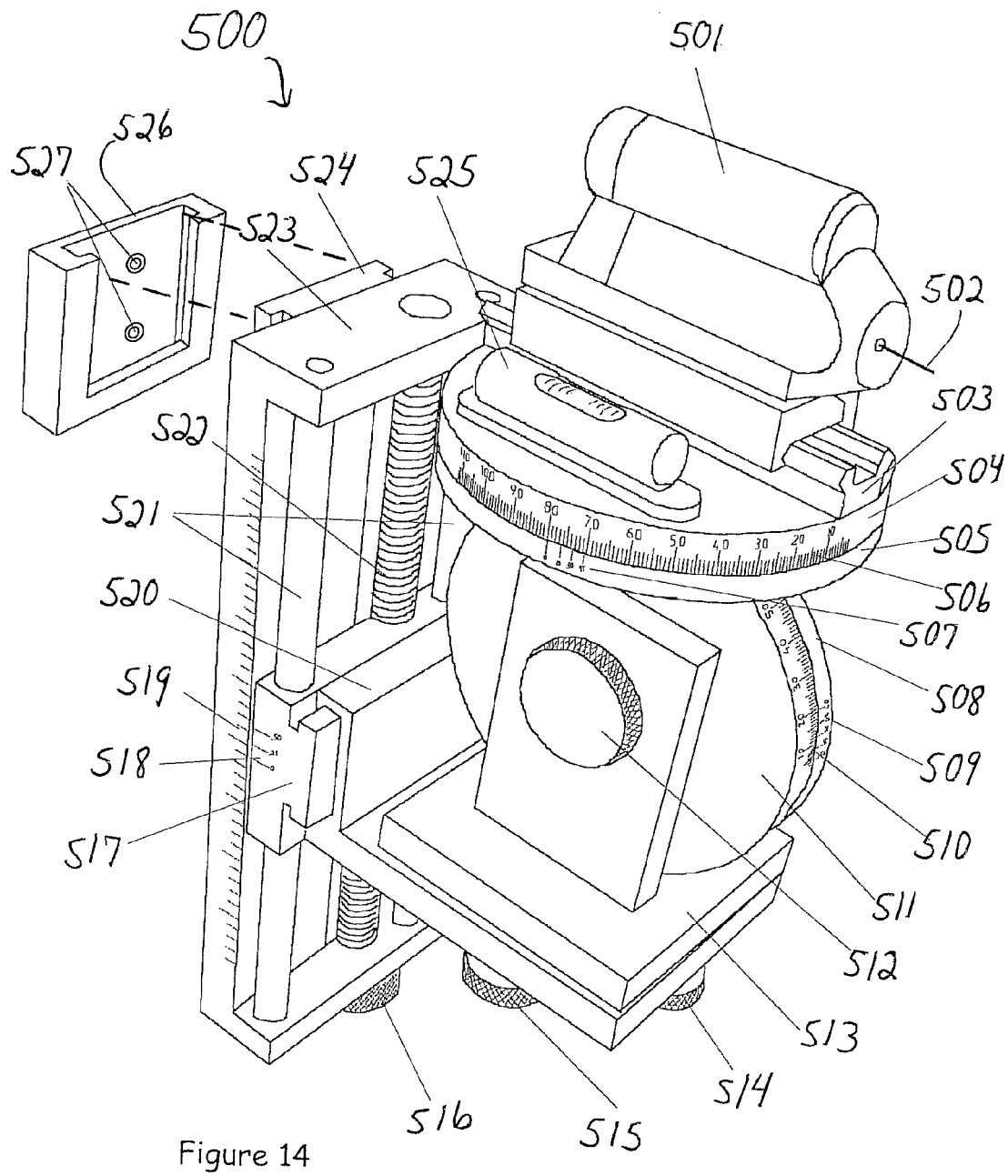
FIG. 14 illustrates an especially-preferred embodiment of the invented laser light unit, including a bracket for connection of the unit to a surface.

Another construction method in which the laser light unit 10 is particularly beneficial is straightening stud-frame walls, as portrayed in FIGS. 11-13. The laser light unit 10 may be connected to one end 301 of a wall, at the top of the wall and, therefore, high in the air. The platform 25 (for example, upper plate 25') may then be rotated to shine the line in a direction toward the opposite end 302 of the wall to hit an upending tab 304. This may be done, as shown in FIGS. 11 and 12, by quickly attaching a non-permanent plate 303 that extends horizontally away from the wall end 301, or by many other quick and easy means. For example, alternative means of hooking or securing the unit 10 may position the unit 10 to be 90 degrees from its position in FIG. 11 (in such a case, rotating upper plate 25' of the platform would not be necessary). For example, FIG. 13 illustrates an embodiment wherein the non-permanent plate 403 is attached to the end of the wall, upending so that the laser unit 10 may be hooked in a central location that is aligned along the intended center of the wall.

In FIGS. 11 and 12, one target is shown in one location along the top of the wall being straightened, but it will be understood that multiple targets may be provided along the entire length of the wall, and/or a single target may be moved along the length of the wall as various portions of the wall are straightened and secured. While the laser light itself may be visible on the top surface of the wall, depending on the orientation of the laser light to said top surface, it is preferred that multiple targets or a movable target upend(s) from the wall top surface so as to be easily struck by a laser-light line that is parallel to said top surface.

In the case of multiple targets being provided along the length of the wall, a wall portion closest to the laser light may be pushed/straightened until the laser beam hits the closest target, and then that wall portion may be secured in its straightened condition and the closest target may be removed. Then, the second-closest wall portion may be pushed/straightened until the laser beam hits the target (at its point of incidence) on that wall portion, and then that wall portion may be secured in its straightened condition and that target may be removed. Likewise, this may be done for each wall portion, from the closest to the laser to the farthest from the laser, by using each target and then removing it so it does not block the laser beam for straightening of the next wall portion.

Alternatively, multiple targets may be provided along the length of the wall, with the targets preferably having transparent or translucent portions that allow the laser beam to pass through to the next target when the respective wall portion is straightened. Examples of some but not the only targets with transparent/translucent portions are described later regarding FIGS. 18A and B and 19A-C.

In any of the above wall-straightening embodiments, by placing target(s) on the top of the wall in locations that should align with the laser if the wall is straight on its wall plane, the builder can achieve a straight wall in less time than by conventional methods. The wall plane is the intended center plane of the wall that, in the case of a straight wall, passes through the longitudinal centerlines of all the studs. The light 31 emitted from laser unit 30 will either bypass the target completely to one or other side of the target (in which case the wall portion must by pushed substantially), hit the target near one edge of the other (in which case the wall must be pushed slightly), hit an opaque target dead center (which indicates a straight wall portion), or pass through the transparent/translucent portion of the target dead center to pass through the target (also indicating a straight wall portion). Therefore, depending on the type of target and the location of the laser beam relative to the target, the builder may see which sections 320 of the stud wall are not straight and can force them into alignment and secure/reinforcement them.

The apparatus of the preferred embodiments may be used in other methods besides those shown and described herein. For example, the laser light unit may be used for many different roof and construction tasks, for example, to construct or "set" a hip roof without measurement tapes, chalk lines or dry lines or other strings, and without estimating placement of rafters and other structural members. The various methods shown here may also be considered embodiments of the invention, wherein the preferred laser light unit and/or guide are used or alternative laser systems and guides may be used. Referring Specifically to FIGS. 14-19C:

The especially-preferred laser light unit 500 of FIG. 14 comprises the following elements, listed after their call-out numbers:

501. Self contained laser module.
502. Laser beam output.
503. Universal weaver style mount.
504. Horizontal rotary joint movable half
505. Horizontal rotary joint fixed half
506. Horizontal angle scale.
507. Horizontal vernier angle scale.
508. Vertical rotary joint movable half
509. Vertical vernier angle scale.
510. Vertical angle scale.
511. Vertical rotary joint fixed half
512. Vertical rotary joint locking knob.
513. Tilt platform.
514. Front to back leveling adjustment knob.
515. Side to side leveling adjustment knob.
516. Elevation adjustment knob.
517. Elevation slide carriage.
518. Elevation vernier scale.
519. Elevation scale.
520. Lateral adjustment slide.
521. Guide rods.
522. Lead screw.
523. Elevation carriage base.
524. Mounting bracket slide.
525. Bubble level.
526. Mounting bracket socket.
527. Countersunk mounting holes.

It may be understood from the above element list that laser light unit 500 comprises multiple adjustments for fine-tuning the location and direction of the laser beam. These adjustments include horizontal rotary, vertical rotary, tilt (both front to back tilt and side to side tilt), elevations (up and down), and lateral (sliding side to side). The very large horizontal rotary and vertical rotary joints (large plates moving relative to each other) allow extremely fine adjustments to be made.

Figure 15A:
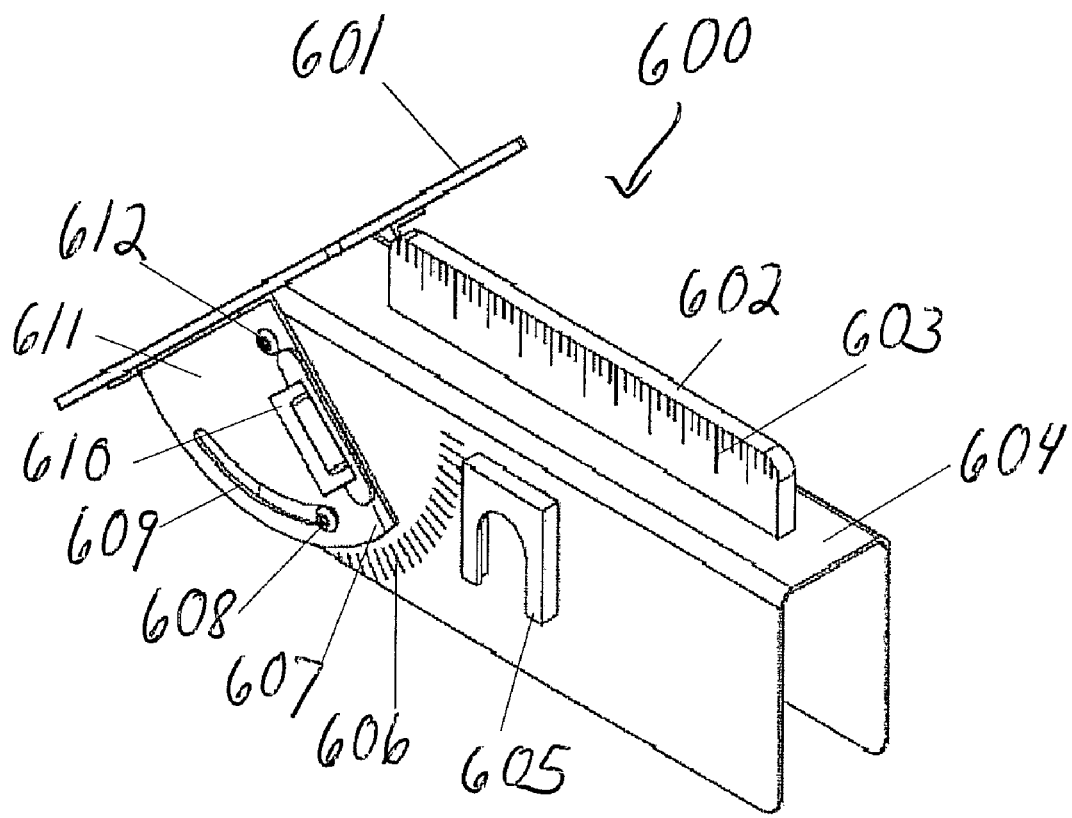
FIGS. 15A and B are right and left side perspective views of another embodiment of a cutting guide, preferably for use with embodiments of the laser light unit.
Figure 15B:
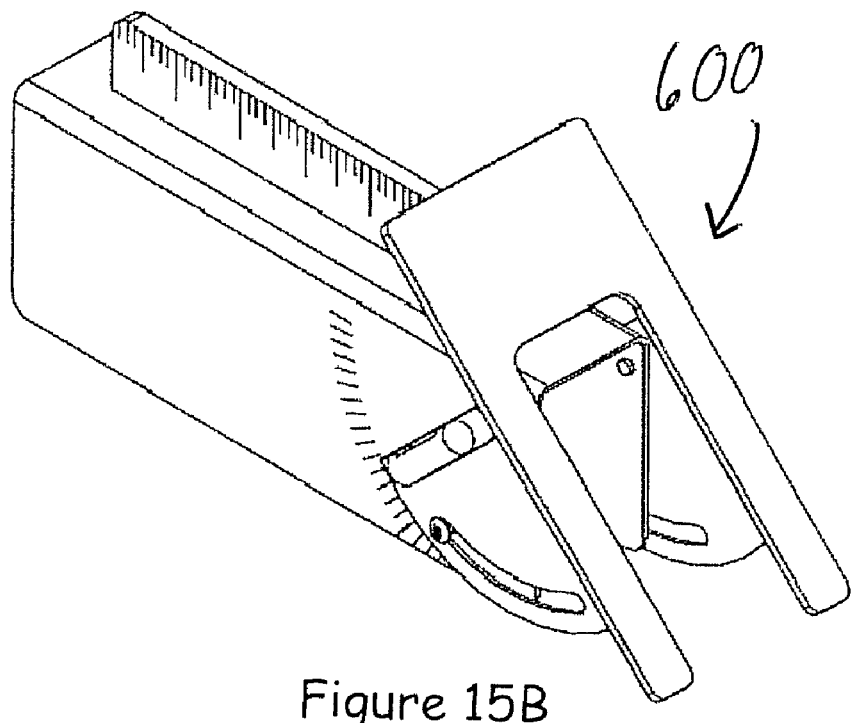

The cutting guide 600 of FIGS. 15A and B comprises the following elements, listed after their call-out numbers:
601. Guide fence.
602. Laser target.
603. Offset scale.
604. Saddle bracket.
605. Pinch clamp interface shoe.

606. Angle scale.
607. Angle index mark.
608. Angle lock nut.
609. Travel slot.
610. Bubble level.
611. Angle plate.
612. Pivot Point.

Cutting guide 600 works in generally the same manner as cutting guide 210 discussed in detail earlier in this disclosure. An elongated laser target 602 with offset scale 603 indicia is provided on the saddle bracket 604 (similar to the rafter cover 212 discussed above), for assisting in proper placement of the cutting guide 600 on each rafter relative to the laser unit. Also, pinch clamp interface shoe 605 is provided on one side of the saddle bracket 604, for receiving a clamping member of a hand-operated clamp to retain the guide 600 on the rafter in the proper placement. For example, a pinch clamp such as an Irwin Quick Clamp™, Handi-Clamp™ TM or other preferably-one-handed clamps against the rafter to retain the guide 600 on the rafter.

Figure 16A:
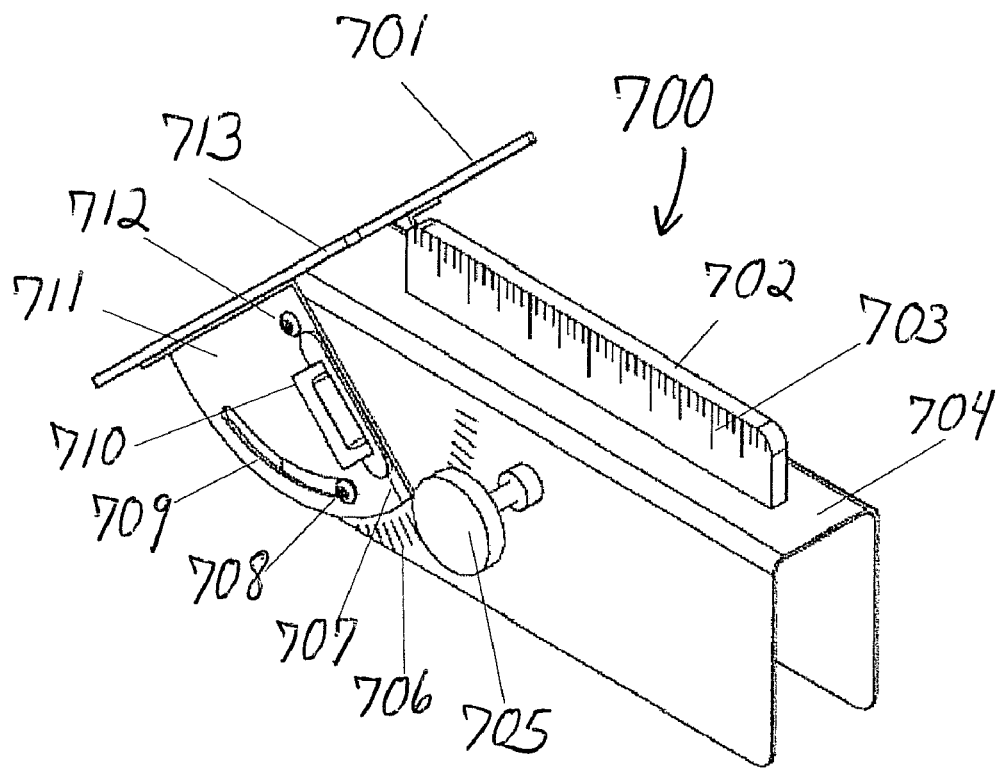
FIGS. 16A and B are right and left side perspective views of yet another embodiment of the invented cutting guide.
Figure 16B:
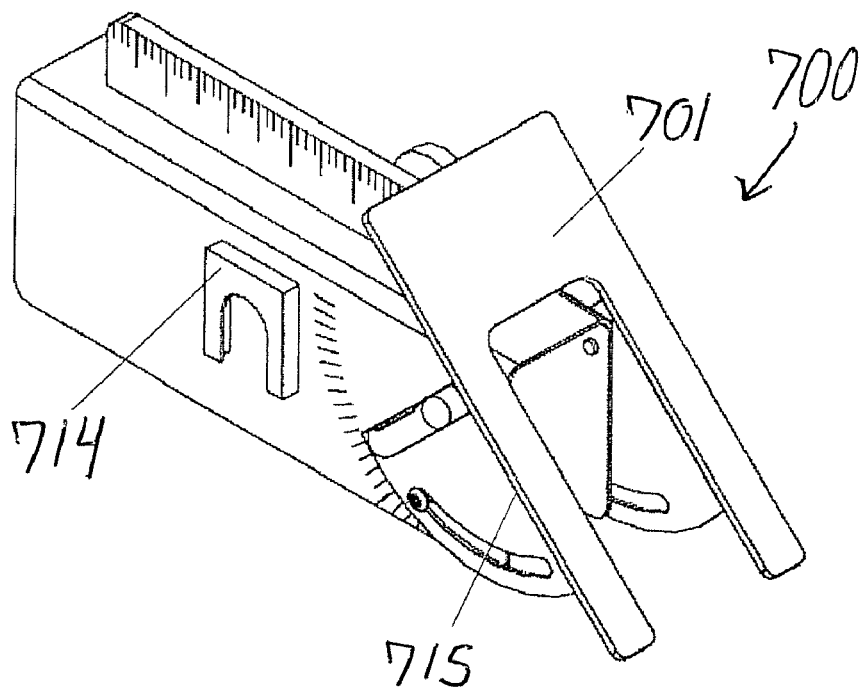

The cutting guide 700 of FIGS. 16A and B comprises the following elements, listed after their call-out numbers:
701. Guide fence.
702. Laser target.
703. Offset scale.
704. Saddle bracket.
705. Saddle locking screw.
706. Angle scale.
707. Angle index mark.
708. Angle lock nut.
709. Travel slot.
710. Bubble level.
711. Angle plate.
712. Pivot Point.
713. Laser reflective edge.
714. Pinch clamp interface shoe.
715. Laser reflective edge.

Cutting guide 700 of FIGS. 16A and B is similar to guide 600, but includes a pinch clamp interface shoe 714 on one side of the saddle bracket 704 and a saddle locking screw 705 on the opposite side of the saddle bracket 704. After the guide 700 is properly positioned on the rafter, the locking screw 705 may be easily screwed in toward the rafter by using the handle of the screw 705, so that an internal end of the screw (not shown) will tighten against the rafter in set screw fashion. Guide 700 also features a laser—reflective edge 715 on the guide fence 701, which may serve as the "target" on the cutting guide 700, the hitting of which indicates proper alignment of the cutting guide with the laser light unit.

Figure 17A:
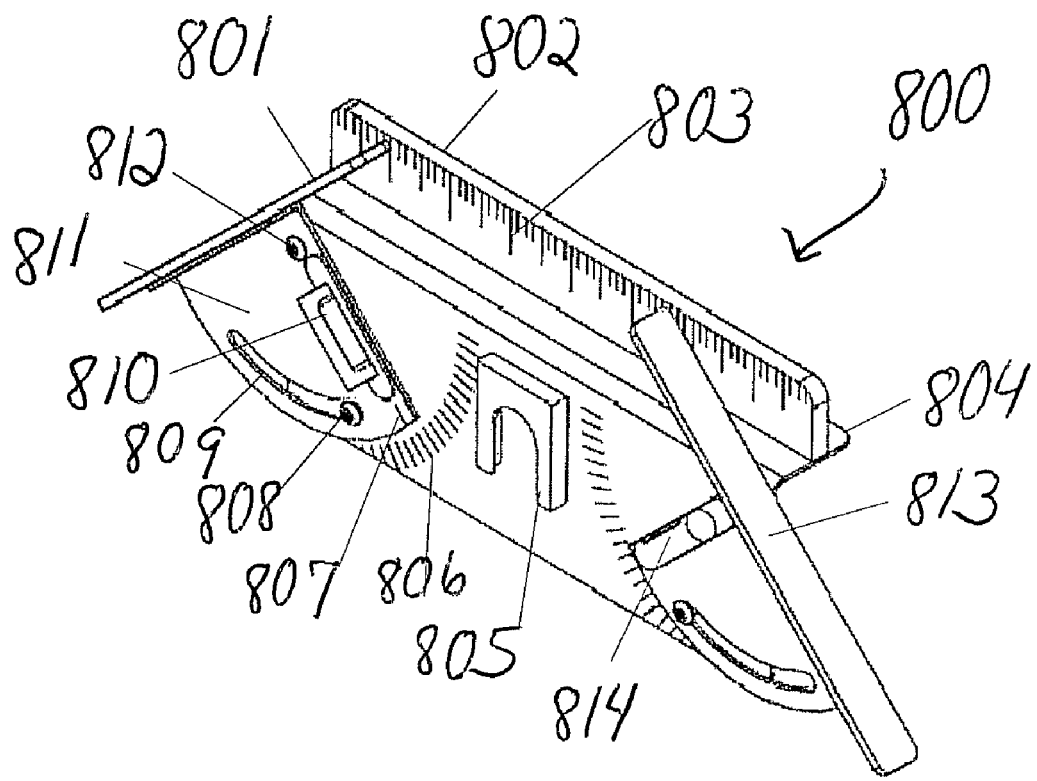
FIGS. 17A and B are first and second side perspective views of yet another embodiment of the invented cutting guide.
Figure 17B:
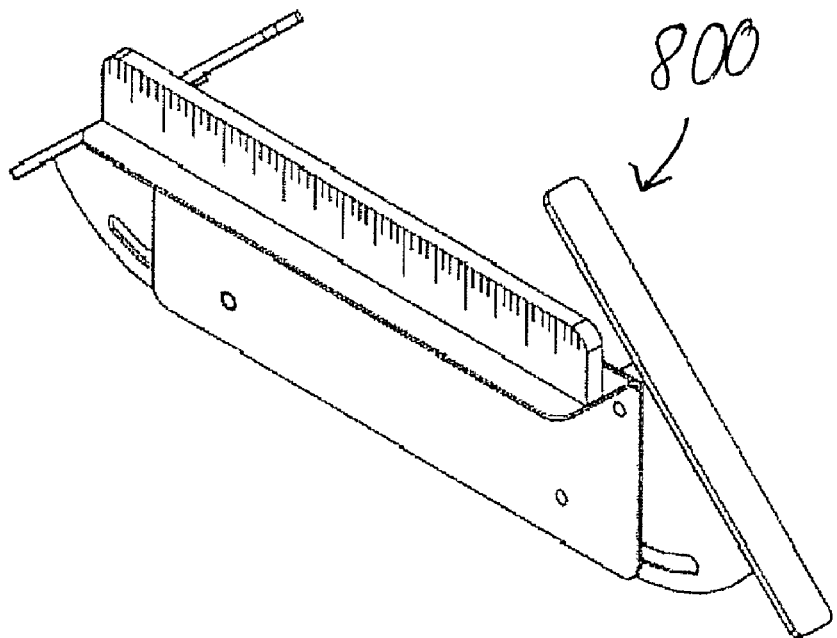

The cutting guide 800 of FIGS. 17A and B comprises the following elements, listed after their call-out numbers:
801. Left guide fence.
802. Transparent laser target.
803. Offset scale.
804. Mounting bracket.
805. Pinch clamp interface shoe.
806. Angle scale.
807. Angle index mark.
808. Angle lock nut.
809. Travel slot.
810. Left side bubble level.
811. Angle plate.
812. Pivot point.
813. Right side guide fence.
814. Right side bubble level.
815. Laser reflective edges.

Cutting guide 800 is a double-ended guide, which comprises a left guide fence 801 and a right guide fence 813, and which allows a builder to saw with either his left hand or his right hand, and to position the guide 800 accordingly. The mounting bracket 804 in this embodiment comprises a generally L-shaped bracket, rather than a generally U-shaped saddle bracket, which will lie along the top surface and one side surface of the rafter during use. A pinch clamp interface shoe 805 is provided to cooperate with a manual clamp that will retain the guide 800 on the rafter, with one clamping arm of the clamp applying force to the shoe 805 and the other clamping arm applying force against the rafter itself.

Each of fences 801 and 813 include only one guide plate for extending along one side of the rafter, and preferably above the rafter to allow for safe and accurate follow-through of the sawing action. By switching the guide 800 end-to-end on the rafter, the builder may select whether the fences 801, 813 are on the right or the left side of the rafter, and the building will use the outermost fence (fence 801 for left-handed sawing, and fence 813 for right-handing sawing) as the guiding surface for the saw. One may note that the fence 801, 813 structures do not cross over the rafter and are entirely external to the mounting bracket 804 (except for the angle lock and pivot point pins/axles). This may be compared to guides 210, 600 and 700, which include portions of guide plate on each side of the rafter as in guide 210.

Figure 18A:
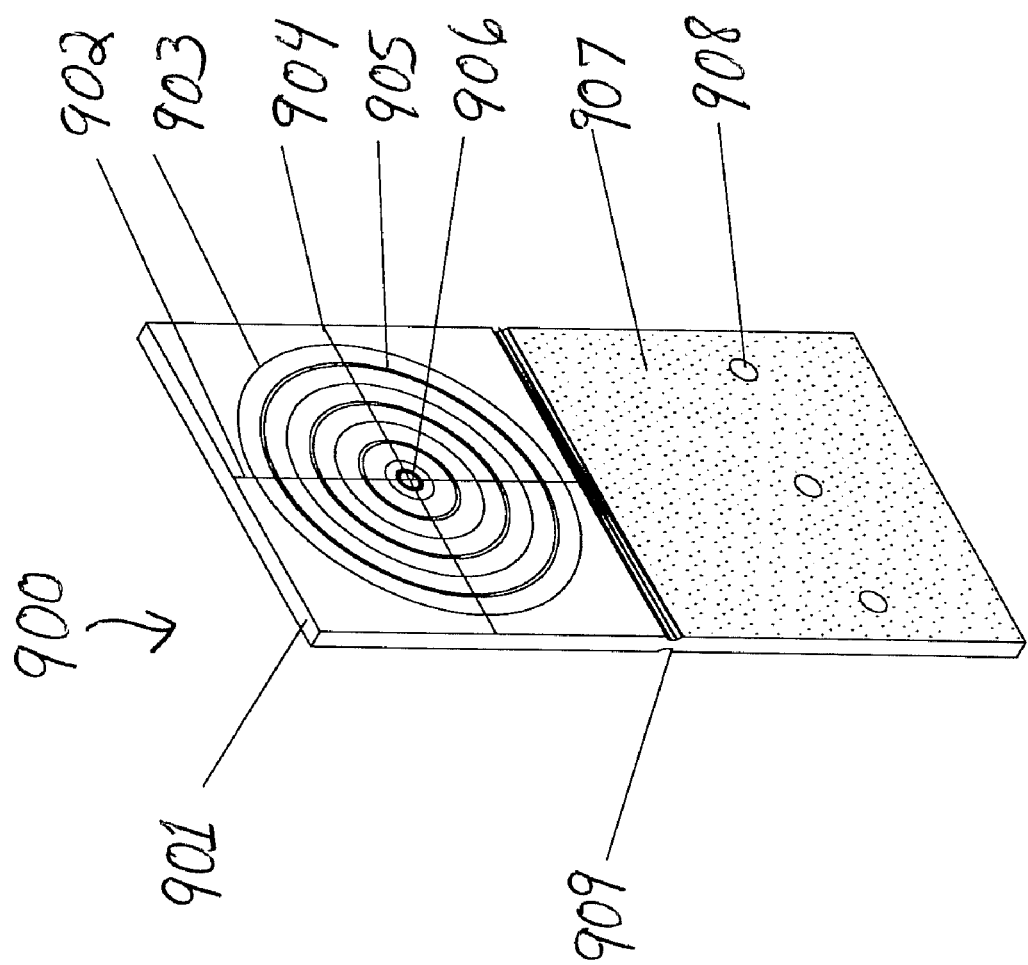
FIGS. 18A and B are perspective views of two, but not the only, embodiments of the invented laser target, which include a hinge line between upper and lower portions of the target for easy bending of the target at said hinge line.
Figure 18B:
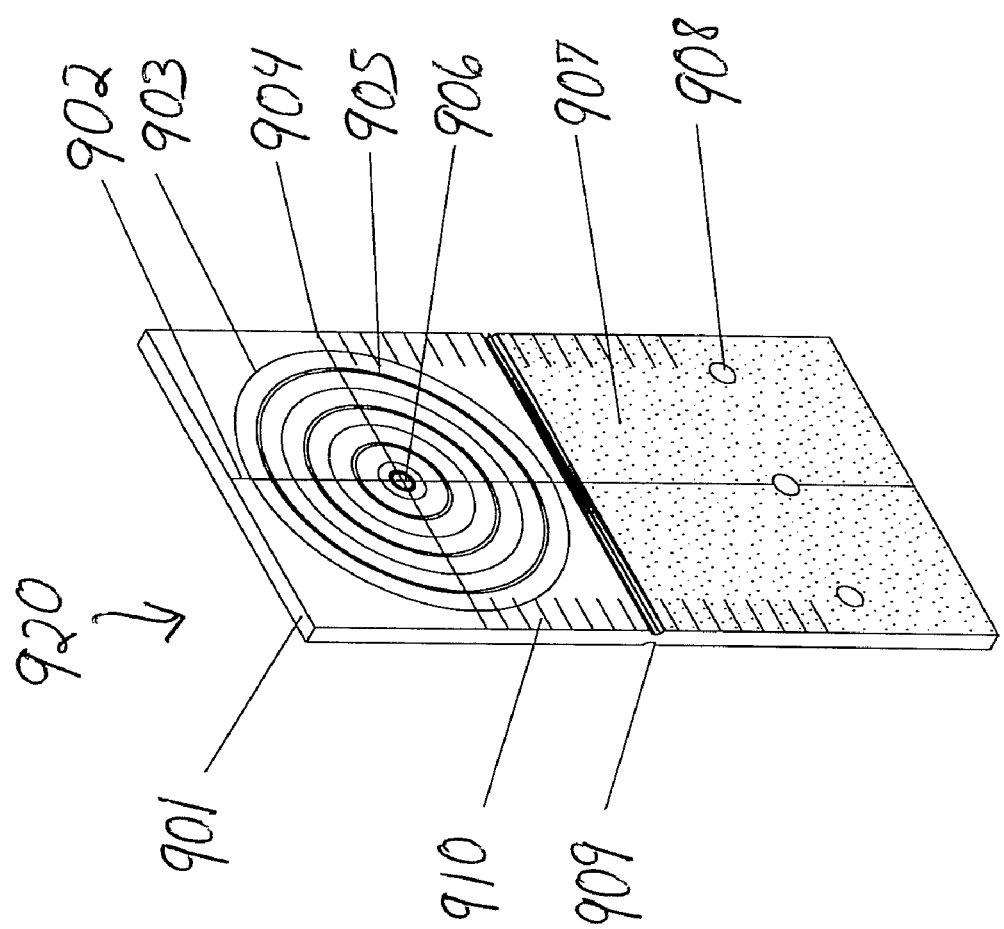

Targets 900 and 920 of FIGS. 18A and B each comprise a target portion and an attachment portion, which include some or all of the following elements, listed after their call-out numbers:
901. Target substrate (plastic, cardboard or metal, for example, and ranging from opaque to transparent and/or comprising reflective portions, as desired for different methods of use) of target portion.
902. Vertical alignment mark or reflective surface.
903. Thin concentric alignment marks or reflective surface.
904. Horizontal alignment mark or reflective surface.
905. Thick concentric alignment marks or reflective surface.
906. Center of target pattern.
907. Pressure sensitive adhesive or magnetic pad on attachment portion.
908. Mounting holes on attachment portion.
909. Bendable hinge joint.
910. Vertical offset scale.

Targets 900 and 920 comprise an upper portion and a lower portion, which may be described as the target portion and the attachment portion, respectively. The target portion comprises a target substrate material that may be a single material, a composite, layers, or other materials. The target portion may be made to provide a wide range of light transmission through the target, for example, an opaque target portion with various alignment marks and/or concentric rings on which the laser beam may hit and be visible by virtue of not passing through the target. Or, some or all of the target portion may be translucent or transparent, so that, when the target is properly aligned with the laser beam (by virtue of proper placement of the wood frame member(s) to which the target is attached and/or by virtue of straightening the wood frame member(s) to which the target is attached) the laser beam will travel through the translucent or transparent portion and, hence, signal the builder that the wood frame member(s) is/are properly placed or straightened.

The attachment portion of the target 900, 920 may comprises a pressure-sensitive adhesive and/or magnetic pad that allows the target to be attached to the wood frame member or other member in the construction. Also, or instead, mounting holes 908 may be provided for nailing, tacking or otherwise pinning the target 900, 920 to the wood frame or other member. The attachment portion may also or alternatively be stapled to the wood frame or other member. The bendable hinge joint 909 allows the target portion to be bent, relative to the attachment portion, into a desired orientation for use. For example, the surface of the frame member or other construction member that is available for attachment of the attachment portion may be at an angle to the desired plane in which the target portion must lie for proper operation of the method, and, therefore, the hinge joint 909 allows the target to be bent to place the target portion in that desired plane. For example, it will be common to attach the target 900 to a horizontal surface of a wooden member, but to require the target portion to upend vertically from said wooden member, for example, as in FIGS. 12 and 21. In such applications, a 90 degree bend of the target 900 at hinge 909 will allow this target attachment and configuration.

Target 930 of FIGS. 19A-C may have some or all of the elements and features described above for targets 900, 920, but preferably has a split attachment portion at its lower end that provides even more flexibility in target attachment and use. FIGS. 19A-C illustrate three of many orientations of the three legs of the attachment portion. These illustrated orientations will allow attachment of the target 930 to a flat surface parallel to the target portion (FIG. 19A), to a flat surface perpendicular to the target portion (FIG. 19B), and to the ridge surfaces (peak) of a truss (FIG. 19C), for example. Thus, the multiple legs of the attachment portion each may be bend independently into the desired configuration that supports the target portion in a stable and preferably un-movable position. Pressure-sensitive adhesive, magnetic material (for attachment to metal plates/members) and/or other attachment material may be placed on one or preferably both side surfaces of each leg, as will be understood by those of skill in the art after viewing these drawings. Also, or instead, mounting holes 908 may be provided in each leg for nailing, tacking or otherwise pinning the target 930 to the wood frame or other member.

EXAMPLES OF PREFERRED EMBODIMENTS IN USE

Use of the preferred combination of laser alignment tools increases the framing team's efficiency and productivity compared to conventional methods of construction by eliminating error-prone cord, string and chalk-line set-up procedures. Laser lines are not subject to sagging or misalignment due to wind interference, or human error in correct chalk-line tensioning or differences in chalk line "snapping" technique. Due to light's inability to "sag," the laser line cannot produce a double image resulting in stud placement problems or any other errors that are typically caused by existing marking practices that involve strings. By using the preferred combination of laser alignment tools, the job is done right the first time and time is not lost in correcting crooked walls, out-of-square roof lines, and a multitude of other problems typically resulting from "cross-string" methods (additional strings used as support strings for the actual measurement string), and chalk-line methods. In short, this tool significantly improves productivity and reduced cost due to improved accuracy and reduced number of workers, as well as significantly reducing errors on the job site. This adds up to significantly less waste, maximizing worker time-efficiency, eliminating weather conditions as an issue for construction of any project, and delivering a final construction product that is significantly more accurate and square then any previously-used method.

Referring to FIGS. 20A and B—Pony Wall in Crawl Space:

Conventional methods include setting-up cross strings for support of measurement strings, in order to try to reduce sag of the measurement strings. Measurements in the conventional methods are indirect. Subtraction for joist and plates then yields the actual measurement of the pony wall stud, all while the builders are working in and around strings lines affixed at seal plate height.

In the preferred methods according to the invention, on the other hand, the laser unit is set inside the crawl space at the height that studs are to be cut and positioned to be able to sweep the work area. The preferred laser method is especially useful for constructing a level wall on a non-level foundation or other non-level surface. In the preferred method, the stud measurements are the actual cut lengths, and the workers are able to move about unencumbered by strings. The main advantage to the preferred stud wall construction method is clearly that the laser marks are precise and result in accurate cutting of the studs because the laser may be used to define a continuous and level plane.

FIG. 20A illustrates attachment of the laser tool and leveling and directing the laser beam at a target at the other side of the foundation wall, which established a level line whereby the uneven studs can be marked and/or cut on a level plane. FIG. 20B illustrates the preferred method of cutting the studs using the cutting guide, wherein the same laser unit remains in the same configuration as in FIG. 20A, except that it is lowered to account for the cutting guide offset between the guide plate (or "guide fence") and the saw blade. By moving the cutting guide from stud to stud, each time positioning the cutting guide to "intercept" the laser beam, the builder knows that each stud will be cut on the same, horizontal plane indicated by the laser beam.

The preferred invented methods for pony wall construction for a crawl space are portrayed in FIGS. 20A and B, wherein the following elements are called-out in the drawings, and listed and briefly described below.

1001. Foundation wall.

500. Laser unit, hung at first end of pony wall being constructed, on a first end stud that has been precut to correct length (see 1011, below). The laser tool 500 is shown in FIG. 20A as being adjusted to a first height (elevation) so that its beam hits target 1006 on the second beam 1007 stud to indicate the desired out-line on each stud for the desired stud height. The laser tool 500 is adjusted to a second height (elevation) in FIG. 20B, so that its beam is aligned with lowered target 1018, the beam in this position indicating (hitting the studs) at the saw blade offset that will allow cutting of the studs accurately at the cut-line shown in FIG. 20A.

1003. Laser beam.

1004. Extra long stud, as an example of stud that needs to be cut to accurate length.

1005. Marking of stud height at laser beam level in FIG. 20A with pencil, for example, according to laser beam shining from laser tool 500 to the laser reflector target 1006 to indicate the cut-line.

1006. Laser reflector target, according to one embodiment of the invented target.

1007. Second end stud, also precut to correct length.

1008. Bottom plate setting on un-even pony wall footing.

1009. Un-even pony wall footing.

1010. Foundation footing.

1011. First end stud precut to correct length.

1012. Laser of the laser unit adjusted with saw blade offset, that is, the laser of the laser unit being lowered so that the beam hits the lowered target 1018, and so that the cutting jig 1016 may be properly placed on each uncut rafter from left to right in FIG. 20B by aligning the jig with the laser beam.

1013. Offset Laser beam, resulting from lowering of the laser, as described for call-out 1012 above.

1014. Laser reflection from edge of saw guide plate, in embodiment wherein the reflective edge is provided as the indexing means for proper placing of the cutting jig relative to the laser beam.

1015. Desired stud length, which will result from cutting the studs with a hand-held saw guided by the cutting jig 1016.

1016. Cutting jig.

1017. Laser beam path when not blocked by cutting jig.

1018. Laser reflector target positioned with saw blade offset.

One may understand from FIGS. 20A and B, and the listing and comments above, that the desired cutting line is established and confirmed by the following steps, and then the studs are cut by placement of a cutting jig at a location, guided by the laser beam, that accounts for the saw blade offset. First, the first end and second end studs (which may be portions of the foundation wall) are pre-cut to the desired height (length) and installed on the plate on the foundation footing. The laser unit is then installed at the first end of the crawl space and the target is installed at the opposite end, and the beam between the two is used to mark the studs at the desired cut-line. The laser and target are then lowered to account for the known saw blade offset, with the laser beam again hitting the (lowered) target. The cutting jig is then installed on the stud closest to the laser so that the beam hits the reference point on the jig (in this case, the reflective edge), that stud is cut by the saw, and then the jig is moved one stud over, so that the jig placement and sawing are repeated for each stud.

When using the cutting guide, the studs and bottom plate can be attached to the footing and studs then cut in-place, as described above. Alternatively, the Studs, one at time, can be temporally hand-held in position on a temporally-positioned bottom plate, the cutting guide attached to a temporally-positioned stud and aligned to the laser beam, then the stud may be marked according to the cutting guide and moved for cutting. Once all of the studs are cut, they are attached to the top and bottom plate to form the pony wall, the pony wall is positioned on the footing and permanently attached.

Figure 21:
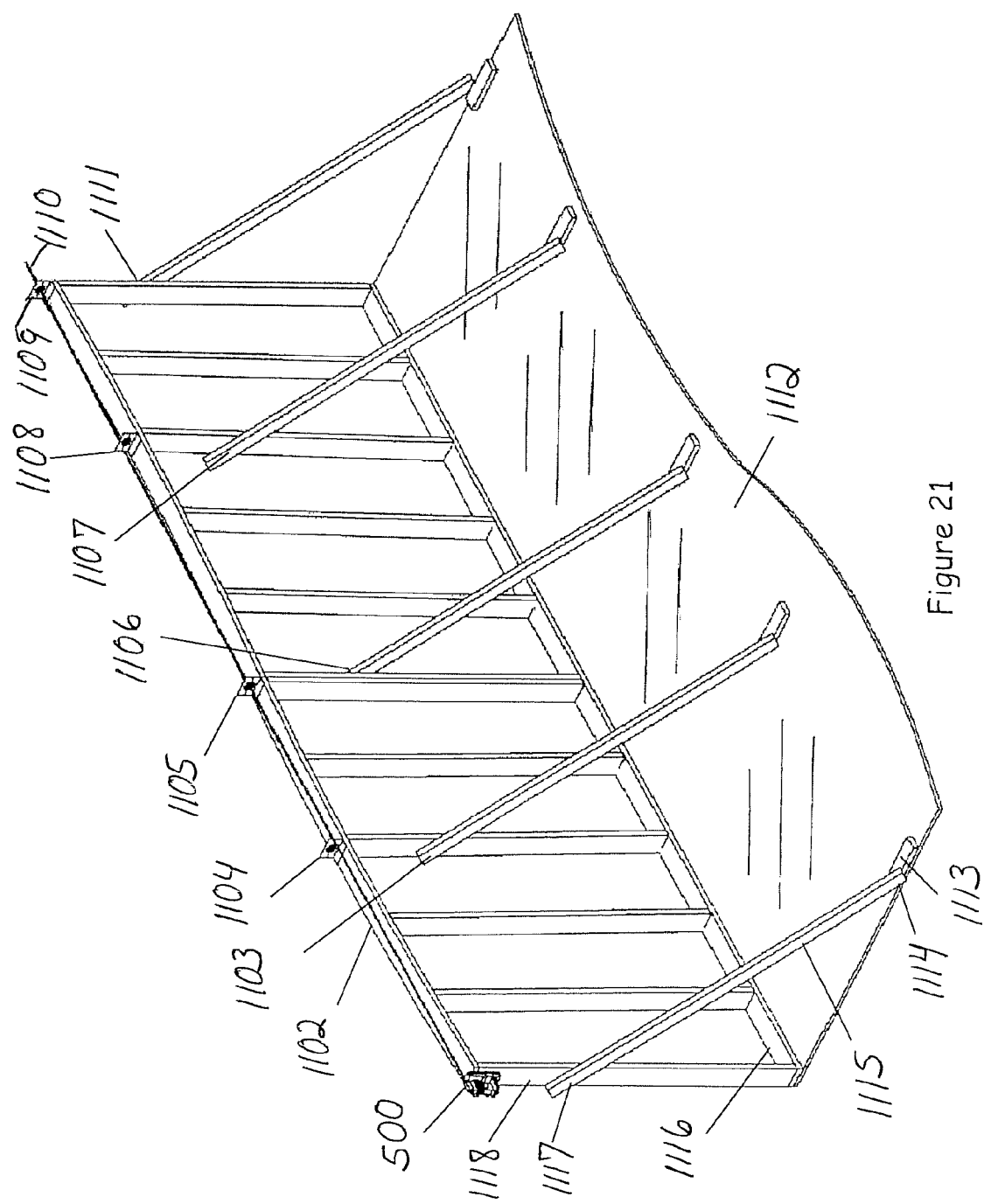
FIG. 21 is a perspective view of the especially-preferred laser light unit of FIG. 14 in use in a wall-straightening method, wherein multiple invented targets are installed along multiple portions of the wall.

Referring to FIG. 21—Wall Alignment:

In conventional building methods, after the walls are raised ("stood") and attached to the floor, two nails are typically used to attach blocks which extend up above the top of the walls for each outside corner. String lines are affixed to these nail blocks 1½"-2" above interior walls. A gauge, usually consisting of a 2×4 is then used to run the length of each wall. If the wall wanders away from, or into, the pulled string, then the wall is pulled straight by gauging the wall to the string and the wall is braced. These methods are well known in the industry as the standard for wall alignment.

In the preferred methods according to the invention, on the other hand, after the walls are stood and attached to the floor, embodiments of the invented laser targets are attached. Reflective corner targets, which would optically reflect the beam at a perfectly 90' angle, may be used at the end of each wall, so that a laser beam accurately directed at the corner target will turn a corner and continue down the next wall, etc., as many times as needed. Also, sub-targets, having a target portion that is a transparent/translucent medium, may be used along the length of a given wall, wherein such sub-targets would both show the laser mark (where the laser hits the sub-target) and yet to allow the laser beam allow to continue on to the next sub-target and or end target. The end target would be either solid (non-transparent and non-translucent) reflective targets or prismatic targets to turn another corner or even split the beam to send-off the single source of light at another 90' angle, with sub-targets installed as needed.

These preferred methods result in the laser tool being placed in one location but able to "map out" the entire wall system, with little or no chance of error. The laser shoots through transparent/translucent targets to the end of the wall targeting system. Walls would then be adjusted to align to all targets, as previously described for FIGS. 11 and 12, leaving the entire structure square and all walls straight. Since light does not bend, with a leveled laser marker, all points are perfectly aligned. There is no need or want for to visually align walls from the floor, which visual methods include human error as well as mechanical error. These preferred methods eliminate all of the block-setting and string-hanging and the later removal and disposal of the blocks and string lines. It also eliminates injuries caused on the work-site by workers tripping over string lines, which increases cost and delays the project.

FIG. 21 portrays the preferred methods for straightening one length of wall, wherein the following elements are called-out in the drawings, and listed and briefly described below:

500. Laser alignment tool (laser unit).

1102. Top plate.

1103. Temporary brace adjustment point.

1104. Laser target (sub-target with transparent/translucent portion).

1105. Laser target (sub-target with transparent/translucent portion).

1106. Adjustment point.

1107. Adjustment point.

1108. Laser target (sub-target with transparent/translucent portion).

1109. Laser target (sub-target with transparent/translucent portion, or may be the end target).

1110. Laser beam.

1111. Adjustment point.

1112. Floor.

1113. Anchor block.

1114. Brace pivot point.

1115. Temporary support brace.

1116. Bottom plate.

1117. Adjustment point.

1118. Wall stud.

One may see in FIG. 21 that the laser light of laser unit 500 has previously been aligned to shine its beam parallel to the longitudinal centerline of the top surface of the top plate, that is, wherein the longitudinal centerline should be if the entire wall is straight. This is typically done by aligning the laser light beam to hit a target at the opposite end/corner of the wall.

The sub-targets (between the laser unit and the opposite-end target) may be installed one-at-a-time, after the laser is aligned to hit the opposite-end target, and this is the preferred method if the sub-targets are opaque. The opaque targets are installed one-at-a-time, starting with the sub-target closest to the laser unit, so that the wall portion closest to the laser unit may be straightened and secured. Then, the closest sub-target is removed, and the next closest is installed, and its respective wall portion is straightened and secured, etc., until the farthest target is installed and the farthest wall portion straightened and secured.

FIG. 21 illustrates how translucent, transparent, or partially translucent or partially transparent sub-targets may be installed and used generally at the same time. One may note that the beam in FIG. 21 is hitting and passing, or passing by, the sub-targets spaced along the top plate of the wall, as various locations on/near the targets because of wall portions being "wavy." For example, the beam hits and passes through target 1104 between the center and the right edge of target 1104, hits and passes through target 1105 at about dead center on the target, passes by the left edge of target 1108, and hits and passes through target 1109. The builder may see whether each portion of the wall is straight, based on whether the beam hits and passes through the target at the center of the target, and may straighten the wall portions by pushing and securing the wall portions, for example, at the adjustment points indicated in the figure. The target preferably is sufficiently translucent that the beam substantially passes through the target, but, at the same time, preferably has properties that allow the beam "mark" on the target to be seen by the builder. This may be done, for example, by making only the center of the target translucent, so that a beam hitting the target anywhere but the center will reflect and been easily seen. Or, portions of the target may be translucent and portions may be opaque and reflective, or the entire target portion of the target may be of a material that allows most of the light to pass through but reflects or otherwise allows some light to be seen on the target where the beam hits the target.

Figure 6:
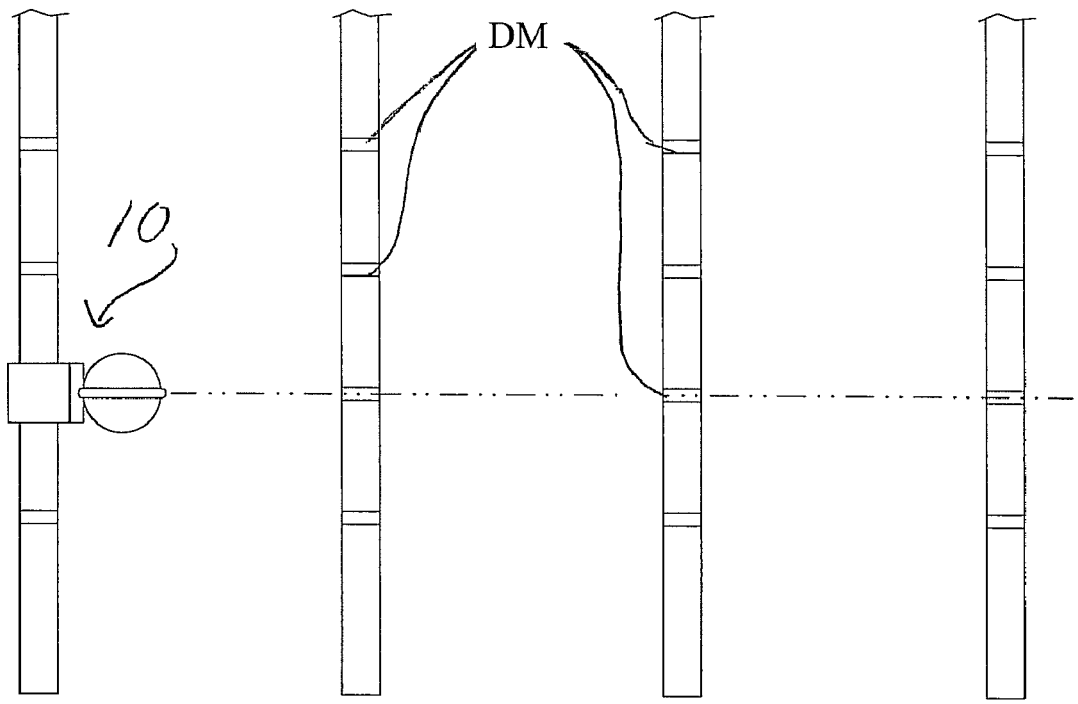
FIG. 6 is a top view of multiple rafters that have been marked with "drive marks" (DM) at the time of manufacture at multiple locations spaced along the length of each rafter. The laser light unit of FIGS. 1, 4 and 5 is shown in FIG. 6 resting on one of the rafters and emitting laser light that extends across all of the rafters, hitting the marks on each rafter. The configuration of FIG. 6 may result, for example, from two scenarios: 1) the rafters have been aligned and installed accurately, and the laser light unit is being used to confirm this correct alignment and accuracy by shining across and hitting each rafter at the same mark along the length of the rafter; or 2) the laser light unit was installed on the rafter to the far left in the drawing, and, subsequently, the builder has aligned the other rafters correctly and accurately by using the laser light as a guide.
Figure 22:
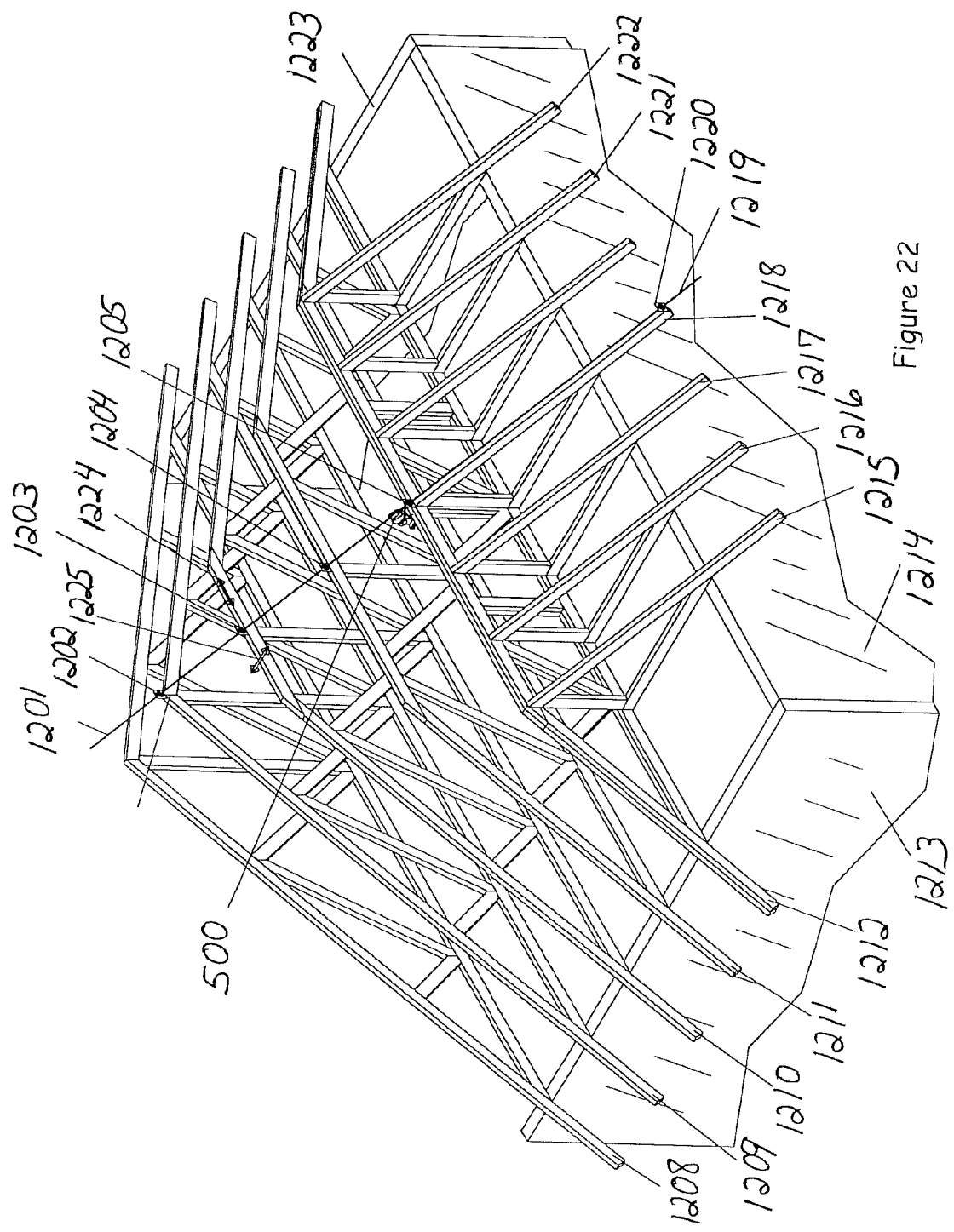
FIG. 22 is a perspective view of the especially-preferred laser light unit of FIG. 14 in use in a stepped truss alignment method, again utilizing multiple invented targets.

Referring to FIGS. 6 and 22: Setting Trusses and Stepped/Hip Truss Alignment The accuracy of truss placement ("setting of trusses") according to conventional methods is subject to wall locations and wood imperfections that affect the flatness of the "plane" that is created by the top surfaces of the walls on which the trusses are to be set. Conventional methods typically result in irregularities and/or "lack of square" due to the above-mentioned ancient use of chalk-lines in the wind, and, consequently, in results of marginal quality. Typically, there are so many chalk-line and dry-line methods, ruler and square methods, and estimation methods in use in construction, that any and all errors become compounded and multiply through the building project. This is especially true by the time the trusses are set, and a great deal of waste of materials and time is experienced because the roof sheet stock or ply board does not fit correctly when attached to the trusses. This increases the price of construction as well as decreasing the quality of the construction being done.

On the other hand, the preferred methods according to the invention for marking and setting trusses obviates the above problems of the conventional methods. Trusses, as delivered from the truss manufacturer, will preferably have an exact laser "drive mark" provided thereon. See FIG. 6, for a schematic example. The drive marks are placed on the truss members that are destined to be on one side of the building to prevent trusses from being placed backwards. Trusses are placed using a pre-set laser, targeted on plum at the drive mark on all trusses removing any chance for errors, resulting in a flat, square roof plane. The advantage to this is that all trusses will be placed exactly the same. This method not only improves accuracy but also cuts down on set up time, manpower and weather conditions, resulting in improved quality and decreased waste.

In conventional methods for stepped/hip truss placement and alignment, strings are pulled across the span to be filled with the hip trusses. The hip trusses are then set on the plane of the strings based on the "eyeball" measurement of a man on the ground who makes a judgment that it's square and level.

On the other hand, in the preferred methods of the invention portrayed in FIG. 22, the laser unit 500 is set on the first stepped double truss 1212 pointing down at a targets 1205 and 1220 located on center jack truss 1218. Once laser beam 1219 is center on targets 1205 and 1220, laser unit 500 is then rotated 180 degrees to establish laser beam 1201, with no other adjustments except for said 180 rotation. Stepped truss 1211 with target 1204 is positioned to approximate location, final locations adjustments are made by moving the truss in the directions 1224 and 1225 to center laser beam 1201 on target 1204. Additional trusses 1210 and 1209 are aligned in the same fashion. The resulting finished hip roof surface is free high and low ridges caused by inaccurate truss alignment.

The preferred invented methods for stepped truss alignment for a hip roof are portrayed in FIG. 22, wherein the following elements are called-out in the drawing and briefly described below:

1201. Laser beam projection B (later in the method, laser beam directed to the uppermost target 1202 at the peak of the hip roof).
1202. Laser alignment target (uppermost target).
1203. Laser alignment target (between uppermost target 1202 and the laser unit)
1204. Laser alignment target (also between uppermost target 1202 and the laser unit)
1205. Laser alignment target (directly behind laser unit).
1206. Trust peek.
500. Laser unit.
1208. Second full truss.
1209. First full truss.
1210. Third truss, a stepped truss.
1211. Fourth truss, a stepped truss.
1212. Stepped double truss.
1213. Structure wall or beam.
1214. Structure wall or beam.
1215. Jack truss.
1216. Jack truss.
1217. Jack truss.
1218. Center Jack truss.
1219. Laser beam projection A (early in method, used to align the laser to an accurate hip roof plane).
1220. Laser alignment target at outermost end of center jack truss.
1221. Jack truss.
1222. Jack truss.
1223. Structure wall or beam.
1224. Direction of movement A.
1225. Direction of movement B.

Therefore, one may describe the method of wood frame hip-roof construction as comprising the steps of: providing a laser unit with a laser source and multiple joints for aiming the laser source to emit a laser beam; providing an outer target and an inner target, each having a target portion and an attachment portion (wherein the right of FIG. 22 may be considered the outer direction, and the left in the figure may be considered the inner direction); attaching the laser unit to an uppermost region of a permanently-installed centrally-located truss of a roof (wherein "centrally-located" means somewhere in between the outermost jack truss and the innermost truss of the roof, and is simply meant to show relative but not absolute placement in the roof); attaching the outer target to a central jack truss that is a distance from the laser unit in an outer direction; establishing a hip-roof-line for the roof by emitting a laser beam from the laser unit at the outer target and adjusting the laser source location and orientation on the laser unit so that the laser beam hits said outer target portion (wherein "hip-roof-line" refers to the projection A which will be on the hip-roof plane); adjusting the laser source to point inward, said adjusting consisting only of turning the laser source 180 degrees to point inward; attaching the inner target to an uppermost region of an inner truss and moving said inner truss until the laser beam, having already been turned 180 degrees, hits said inner target, indicating the inner truss is in a position wherein the uppermost region of the inner truss is on said hip-roof-line; and securing the inner truss into the roof in said position. On may note that the "outer" direction in this hip-roof description is also the "rearward" direction, and the "inner" direction in this hip-roof direction is also the "forward" direction.

Figure 23A:
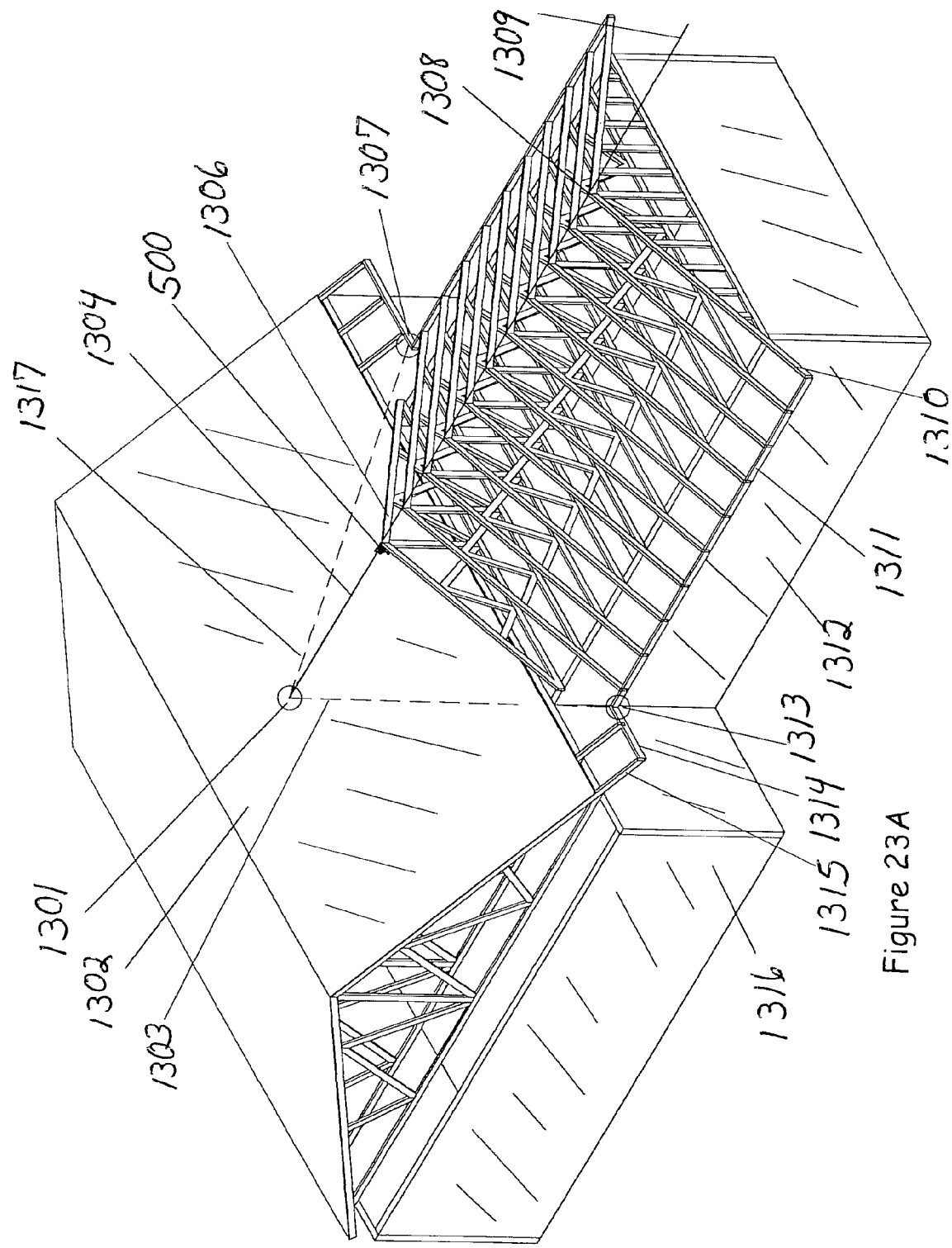
FIG. 23A is a perspective view of the laser light unit of FIG. 14 in use in a roof over-build ridge beam alignment method.

Referring to FIGS. 23A and B—Roof Overbuild:

Conventional Ridge Beam Methods: In conventional roof overbuild methods, determination of the location of the ridge beam on the lower roof (the "wing structure roof" or "wing roof") is done by using a string-line stretched from the last full truss (1306 in FIG. 23A) of the wing roof, over the gap between the roofs, to the higher roof ("existing roof"), using a level where possible. Such a method starts out as guess-work that approximates the correct location for ridge beam attachment. Once this "ball park" location has been found by guess-work, cross-tape measurements are used across the valley, back and forth until a zero point is found for the attachment of the beam.

Conventional Ridge and Valley Alignment Methods: After attachment of the wing roof ridge beam to the existing roof, chalk-lines are snapped from the wing roof ridge beam to the projected intersections of the two roofs.

Pin-pointing jack rafter locations in conventional overbuilds is done by measuring/estimating the location of the first jack rafter relative to the last full truss (1306 in FIG. 23A) of the wing roof, and then measuring/estimating the location of subsequent jack rafters relative to the previously-set jack rafter. This relative measurement from each previous jack rafter can lead to an accumulation of measurement errors. Typically, many of these conventional steps rely on the framer's eye for estimating "square" and "level" from rafter to rafter, and so result in said accumulation of measurement and/or placement errors. These errors can cause misalignment of subsequent roof sheeting joints designed to be attached to common rafter centers of 16 or 14 inches.

In the preferred methods according to the invention, on the other hand, wing roof ridge beam placement in a roof overbuild is done by using the laser unit. The laser unit is placed on the last full truss (1306 in FIG. 23A) of the wing roof, set in line with the full trusses of the wing roof but raised above said full trusses a predetermined/given offset above the wing roof line. The laser beam is then aimed at the first full truss (1310 in FIG. 23A, furthest away from the existing, higher roof), which has a target (1308) placed on it at a height set to the same offset. See beam 1309 in FIG. 23A. This levels the laser to be parallel to the wing roofline. Once this has been done, the laser is rotated 180 degrees, lowered to the exact height of the ridge beam that is to be placed on the wing roof, and the beam is allowed to shine upon the existing roof. See 1304 in FIG. 23A. The point where the beam hits the existing roof is the "zero point" 1301 on the existing roof, that is, the point to which the ridge beam will be connected. Said zero point 1301 is marked with pencil, paint, or other marking means.

Preferred valley alignment methods, as shown in FIGS. 23A and B: After the wing roof ridge beam is placed, with its attachment to the existing roof being at the zero point, the laser unit is hung on the ridge beam that has recently been placed. The laser is set to height of the top of the trusses, as shown by beam 1413 in FIG. 23B, and set to the pitch of the roof, by using the laser unit adjustments discussed previously in this disclosure. Valley locations are then marked on the existing roof by sweeping the laser beam from top to bottom on the existing roof; the line at which the laser hits the existing roof is the valley line 1403 (the left valley in FIG. 23B) and may be marked by pencil, marker, paint, or other marking means. The procedure is repeated on the other side of the ridge beam to indicate and mark the right valley line.

Figure 23B:
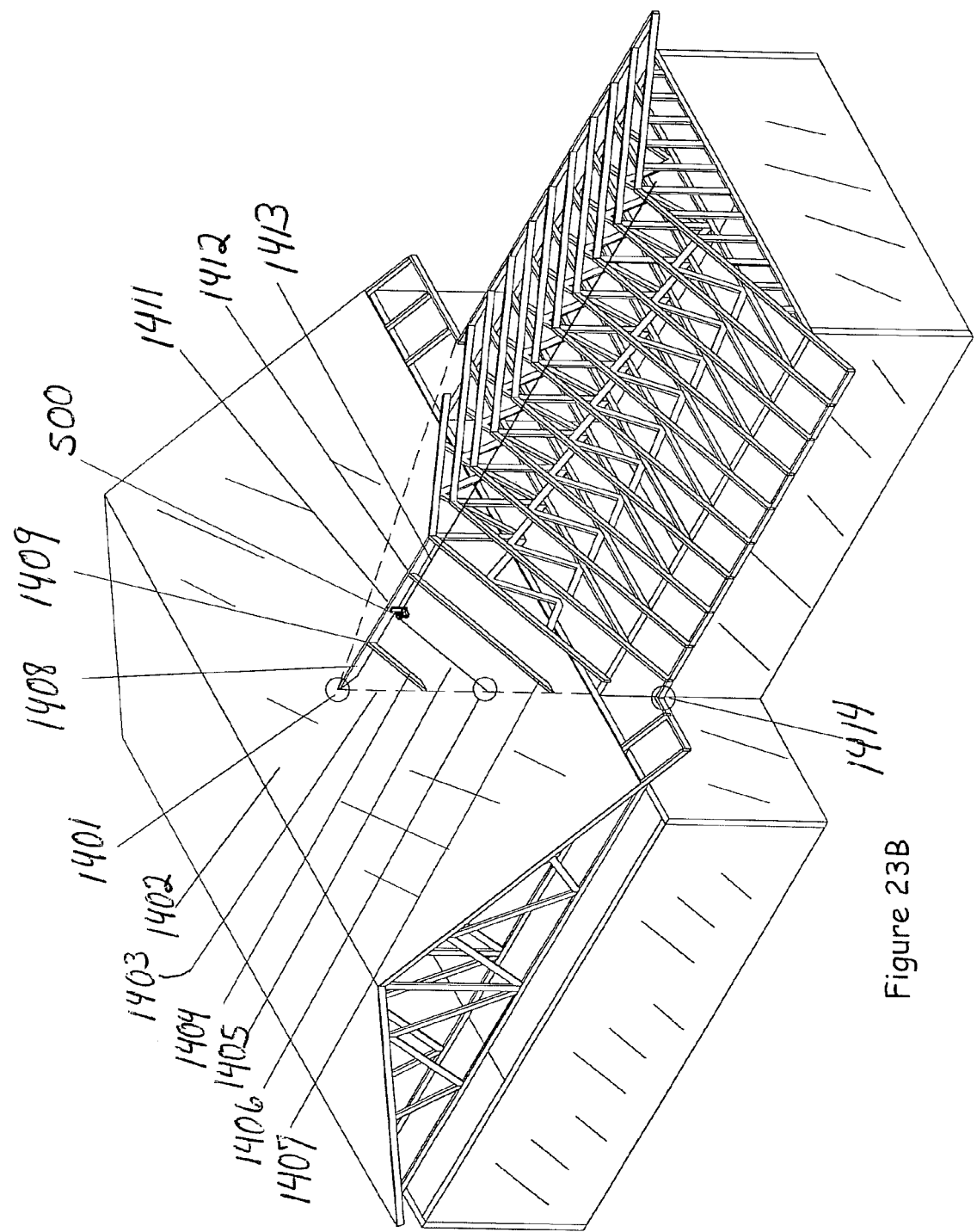
FIG. 23B is a perspective view of the roof overbuild project of FIG. 23A, wherein the ridge beam is in place and jack rafters are being installed by using the laser light unit.

Pin-pointing jack rafter locations along the ridge beam and the valley line is done, in the preferred methods, by placing the laser unit on the ridge beam at the desired jack rafter positions, as shown in FIG. 23B. The laser is set to be square to the ridge beam, lowered to the exact height of the ridge beam, and adjusted to the pitch of the roof. The rafter positions (the outer, lower end locations) are then marked on the valley line (the left valley line in FIG. 23B). This method may be repeated on the right side of the ridge beam and the right valley line.

FIGS. 23A and B illustrate the preferred roof overbuild methods according to the invention that are discussed above. FIG. 23A includes the following elements, listed after their call-out numbers:

1301. Alignment point ("zero point") for ridge beam.
1302. Existing roof ("higher roof") sheeting.
1303. Location of left roof valley.
1304. Second laser beam (in the step of directing laser beam from the last full truss 1306 to the existing roof in a direction parallel to the wing roof ridge line).
1305. Laser unit.
1306. Last full truss of wing roof structure ("lower roof").
1307. Intersection of sub-fascia.
1308. Laser target provided on the first full truss of wing structure 1310.
1309. First laser beam (in the step of directing laser beam from the last full truss 1306 to the first full truss 1310 to determine the wing roof ridge line).
1310. First full truss (or "gable truss") of wing structure.
1311. Sub-fascia.
1312. Wing building structure.
1313. Intersection of sub-fascia.
1314. Sub-fascia.
1315. Truss of main building structure.
1316. Main building structure.
1317. Location of right roof valley.

FIG. 23B includes the following elements, listed after their call-out numbers:

1401. Alignment point for ridge beam and uppermost point of valleys.
1402. Existing roof sheeting.
1403. Location of left roof valley.
1404. A Jack rafter.
1405. Laser beam projection from ridge beam to valley (to determine appropriate placement of lower end of jack rafters, for example, second jack rafter placement at alignment point 1406)
1406. Alignment point for second jack rafter.
1407. First jack rafter.
1408. Ridge beam.
1409. Location of third jack rafter.
500. Laser unit.
1411. Location of second jack rafter.
1412. Location of first jack rafter.
1413. Laser beam projection from ridge beam along wing roof (to determine/confirm that laser is properly set at a height/elevation on the plane of the wing roof).
1414. Intersection of sub-fascia.

Figure 24:
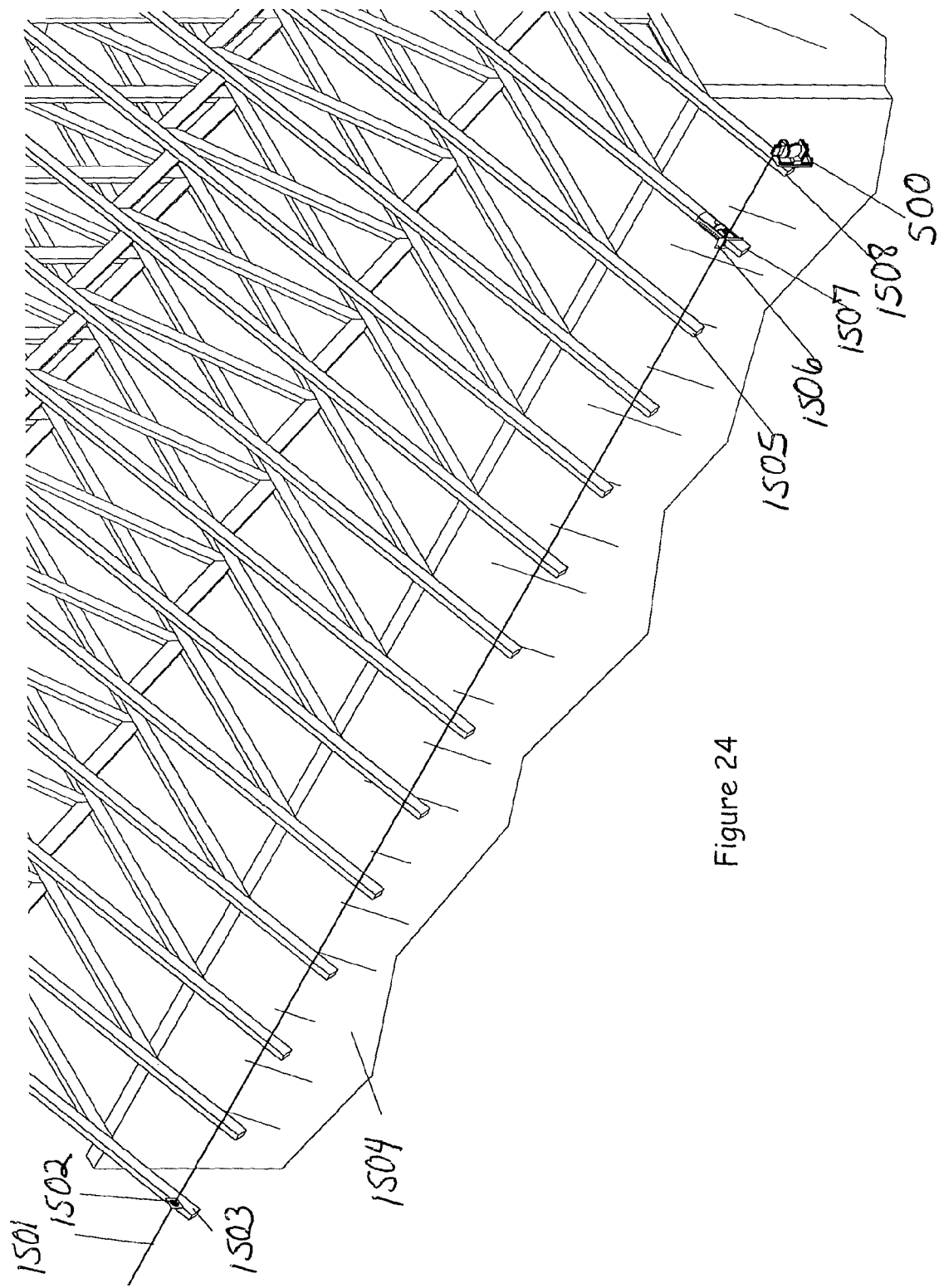
FIG. 24 is a perspective view of the laser light unit of FIG. 14 in use in a truss "tail" cutting method. This method includes use of an embodiment of the invented cutting guide and an embodiment of the invented targets.

Referring to FIG. 24—Truss Tail Cutting:

In conventional methods for truss tail cutting, a chalk-line is snapped across top of the trusses based on desired length of the overhang as determined using conventional methods to determine the distance from the wall below. In a procedure that may be called "establishing the outermost overhang," two of the overhangs (on each of the outermost trusses) need to be measured and marked on the outermost trusses so that a chalk-line can be "snapped" for the between the outermost, marked trusses, for the rest of the trusses. Keeping in mind that wind and human error will cause this chalk-line to vary for any job, as well as the fact that, due to imperfections in the wall below, some truss tails won't receive a chalk-line at all when the chalk-line is snapped. The chalk-line is marked across the top of the trusses, with one snap in most cases. Then a pivotal square, commonly used in the industry, set to plumb (meaning that it is set to a gravitational vertical, to indicate a 90 degree angle to the ground) will be used to set mark the "tail" to be cut off. A pencil mark would then be used as the plumb mark on each truss on either side of truss for the cutting of the overhang to the designated length. The obvious problem here is that the pivotal square method is time-consuming and all of the above-mentioned conditions will cause the "snapped line" to be very inaccurate.

On the other hand, the preferred methods according to the invention comprise a laser unit and cutting guide as the means for cutting the truss trails, with a minimum of conventional measurement and a minimum of errors and inaccuracy. The laser tool is attached to a first truss tail or other predetermined structure, and directed to an end target at an opposite end of the roof. Both the laser and the target are positioned to account for the offset between the cutting guide plate ("fence") and the saw blade. The cutting guide is positioned on each truss end so that the guide "intercepts" the laser beam, confirming that the cutting guide is properly positioned. Thus, each cut of a truss results in proper length of truss tails, and, hence, an accurate overhand and non-wavy fascia.

FIG. 24 illustrates the preferred truss tail cutting methods according to the invention, including the following elements, listed after their call-out numbers:

1501. Laser beam projection on the outermost truss at an end of the roof opposite the laser unit.
1503. Outermost end truss opposite the laser unit.
1504. Structure wall or beam.
1505. Next truss tail to cut, after cutting truss tail 1507 and moving cutting guide from truss tail 1507.
1506. Cutting guide (also called the "cutting jig").
1507. Truss tail to be cut.
1508. Outmost truss ("end truss") on which the laser unit is installed.
500. Laser unit.

Referring specifically to FIG. 24, the laser unit 500 and a target 1502 are attached at the desired location on the outside trusses (1508 and 1503, respectively) using the above-mentioned conventional process of "establishing the outermost overhang," with the modification that offsets would be added to determine the exact location for the laser unit and target attachment to the outside trusses, to make up for the distance between the saw blade and the guide plate (or "fence") of the cutting guide. See guide plates/fences 214, 601, 701, 801, 813, of cutting guides 210, 600, 700, and 800. The cutting guide is then placed in line with the laser so that the reference tab, edge or other target on the cutting guide is hit ("intercepted") by the laser beam. In FIG. 24, the reference edge of the cutting guide is a reflective edge of the guide plate. Once this has been done, the cutting guide is clamped into place on the rafter, for example, preferably by a one-handed pinch clamp and/or a set screw system, and the tail is cut off.

This process is repeated for all of the truss tails including the end truss, because, once the laser unit and its laser are set, the end target may be removed. The truss which has the laser attached, which was marked by the conventional process at the beginning, would be cut last. Therefore, this process is more efficient if cutting is started at the target end, working back towards the laser. The cutting guide is used, due to the above-mentioned offset, for all cuts. The advantages using this process are that this can be done by one worker in less time than the conventional process and with much greater accuracy.

Figure 25:
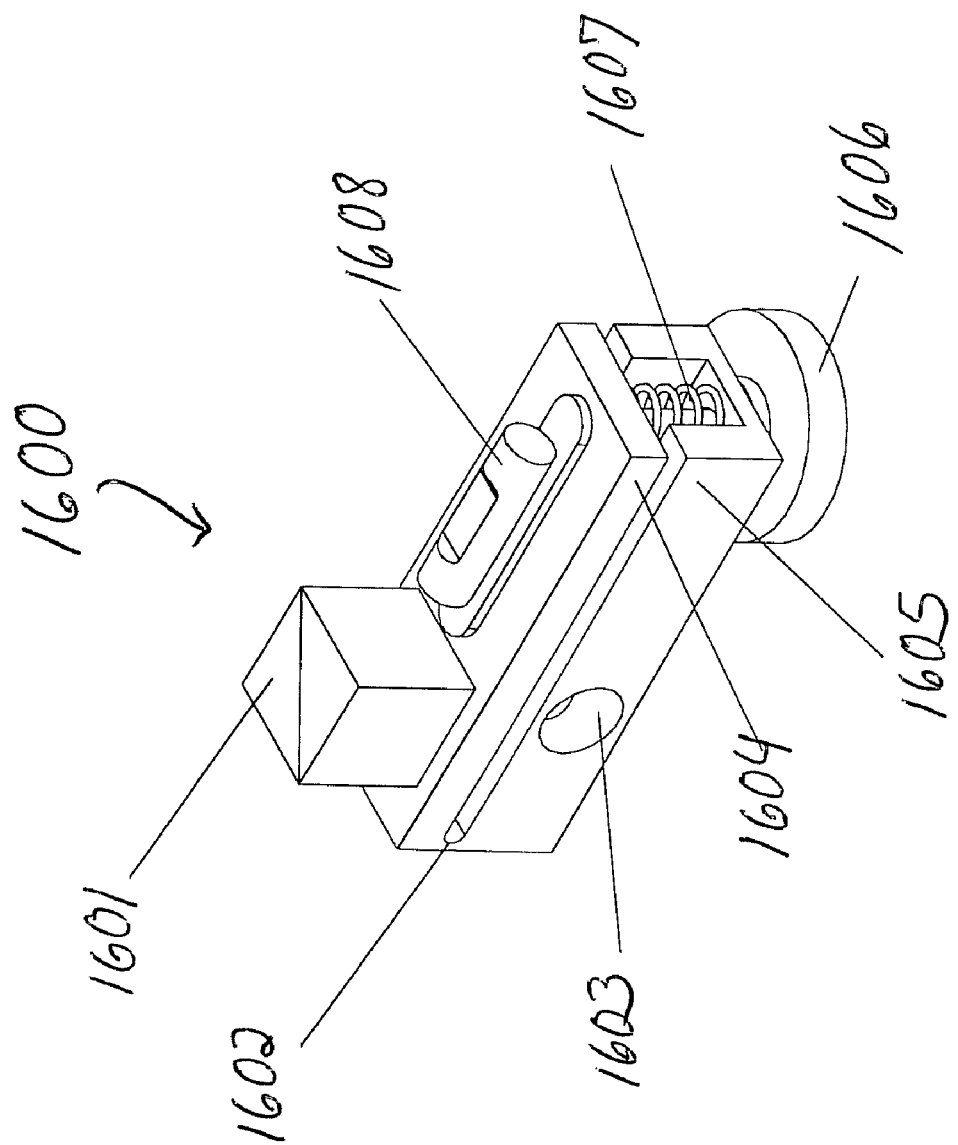
FIG. 25 is a perspective view of one embodiment of a laser prism that may be used in embodiments of the invented methods to redirect or split a laser beam from the laser unit.
Figure 26:
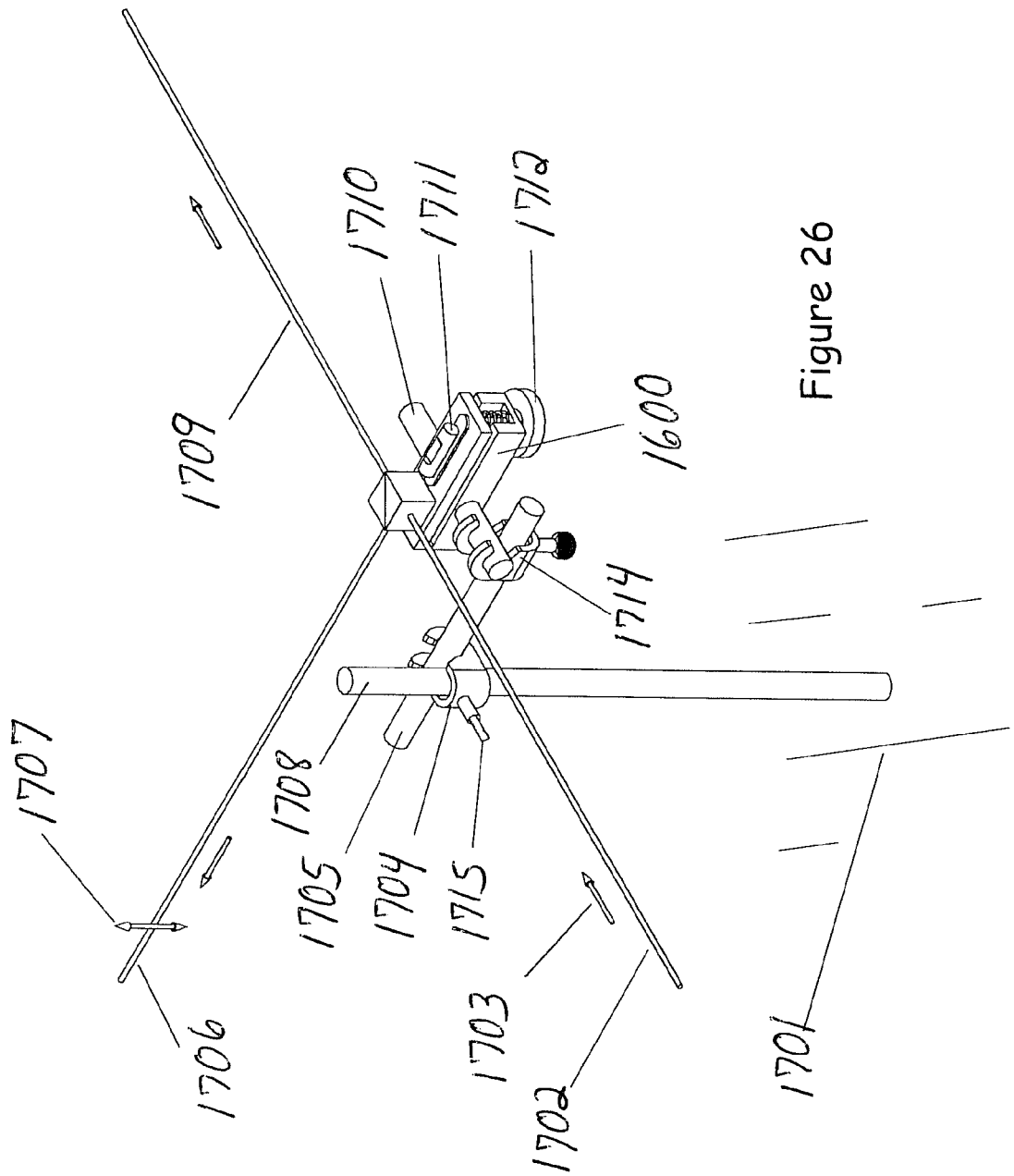
FIG. 26 is a perspective view of one embodiment of a laser prism mounting method, for example, for laser prism assemblies such as shown in FIG. 25.
Figure 27:
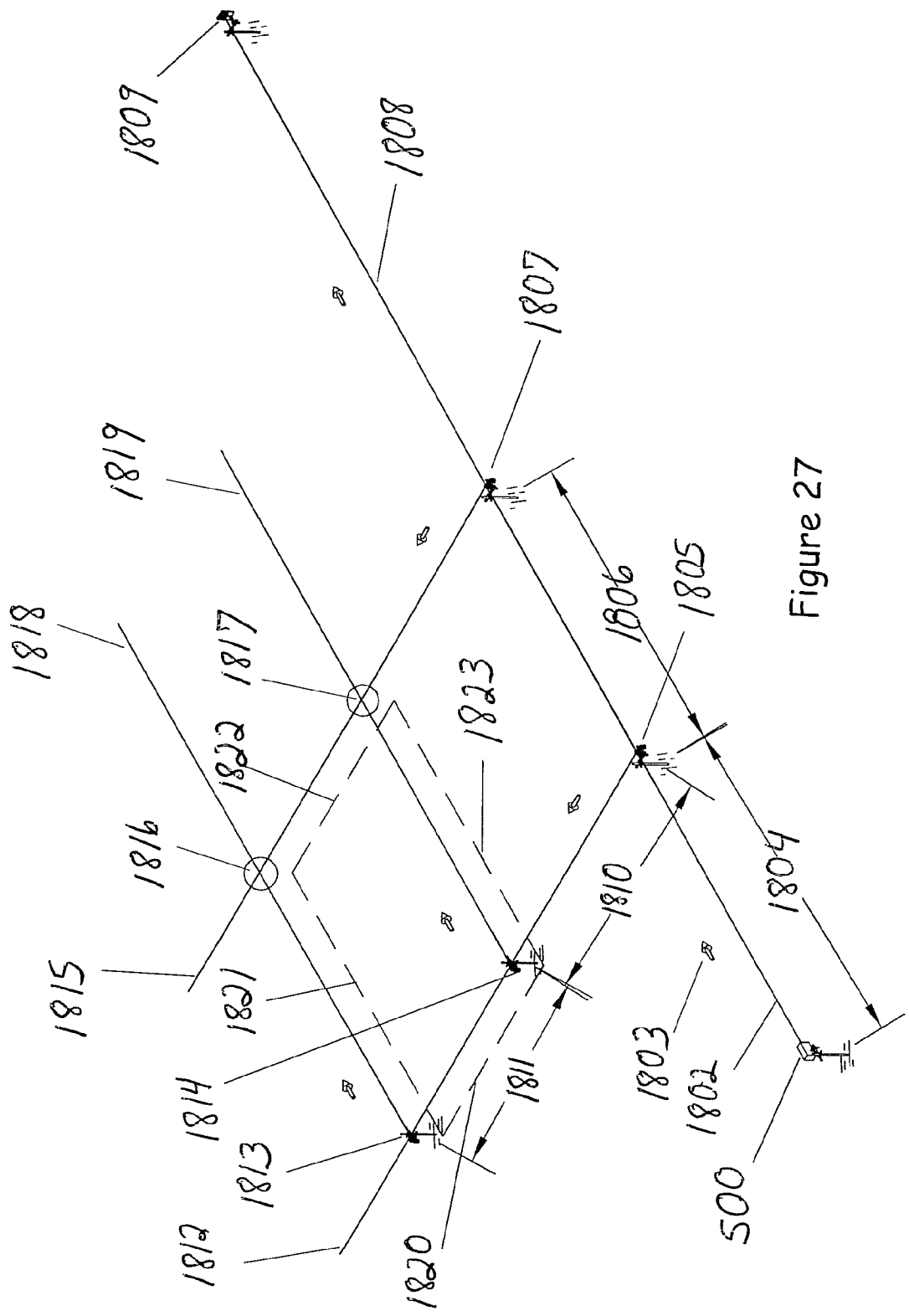
FIG. 27 is a perspective view of one method of building layout using a laser, prisms, and reflector.

Referring to FIGS. 25-27: Laser Prism Apparatus and Building Layout:

The preferred laser prism assembly is used, preferably in combination with the invented laser unit, in alignment and other construction methods described herein and as will be envisioned after reading this disclosure and viewing the drawings. The laser prism assembly is used to split or bend a laser beam at a precise 90 angle. This simple but precise bending of a laser beam allows accurate right angles to be projected over long distances for layout or measurement of construction site or existing structures. Commercially-available prisms can be specified with an angular accuracy of less than 3 seconds. This equates to a maximum angular deviation of 0.05 (<1/16) inches at a distance of 300 ft from the prism. Prisms are available that reflect the entire incoming beam or a specified percentage of the beam, allowing the remaining beam to continue in a straight line. Prisms for the preferred embodiments may be obtained, for example, from Redoptronics Company (http://www.optical-components.com/right-angle-prisms.html) and (http://www.optical-components.com/beam-splitter.html#Beamsplitter%20Cube).

As portrayed in FIG. 25, the preferred prism assembly comprises the following elements, which are listed below behind their call-out numbers:

1601. Right angle beam splitter or corner prism.
1602. Base block flexure point/hinge.
1603. Mounting hole.
1604. Upper base block.
1605. Lower base block.
1606. Tilt adjustment knob & screw
1607. Extension spring.
1608. Single or multi-axis level.

The preferred prism assembly 1600 comprises an optical prism or beam splitter 1601, assembly base (including upper base block 1604 and lower base block 1605), with mounting feature (which may be mounting hole 1603) and flexure point (point or hinge 1602). The prism assembly 1600 is mounted so the appropriate face of the prism is in-line with and centered on an incoming laser beam, while keeping the base approximately level as indicated by bubble level 1608 or at another desired angle. The exact level projection of the laser beam from the prism (as the prism splits or redirects the beam) can be further established by adjusting by thumb-screw 1606, which freely rotates through base (at lower base block 1605) and is threaded into the upper base block 1604. This action either compresses or releases spring 1607, to cause a small angular change between the upper and lower base blocks 1604 and 1605, about flexure point 1602. Because the lower base block 1605 will typically be anchored to a post, pin, or other stationary structure, operation of the thumb-screw 1606 to adjust the spring 1607 will change the orientation of the upper base block 1604 and the prism 1601.

As illustrated in FIG. 26, the prism assembly 1600 can be easily and adjustably positioned by mounting upon commercially-available rods and clamps. The elements of one, but not the only, mounting method are shown in FIG. 26, with the elements listed after their call-out numbers:

1701. Mounting surface or ground.
1702. Incoming laser beam.
1703. Laser beam direction indictor.
1704. Commercially available rod clamp.
1705. Mounting rod.

1706. Outgoing 90 degree laser beam.
1707. Tilt adjustment direction of laser beam.
1708. Mounting rod, bolt or survey pin.
1709. Continuation of incoming laser beam.
1710. Mounting rod.
1711. Level indicator for 90 degree laser beam (may be same as single or multi-axis level 1608 in FIG. 25).
1712. Fine adjustment screw for 90-degree-type laser beam tilt (may be the same as tilt adjustment knob & screw 1606 in FIG. 25).
1600. Laser prism assembly.
1714. Commercially-available rod clamp.
1715. Set screw.

The prism assembly 1600 may be installed at the job site by using, for example, mounting rods and bolt or survey pins 1705, 1708 and 1710, as well as clamps 1704 and 1714. Rod 1708 may be a survey pin or other round object driven into the ground 1701 or mounted on a base or other structure member. Rod 1708 is driven into the ground vertically near the location of the desired 90 degree corner. Additional rods and clamps are used to mount the prism assembly to intersect the laser beam 1702. Depending on the type of prism installed on the prism assembly, laser beam 1702 can continue on a straight line as beam 1709 and/or 90 degrees from the laser source as beam 1706. The level of the 90 degree laser beam 1706 (that is, the angle at which the beam 1706 travels relative to the level of beam 1702) can fine adjusted with knob 1712 by means of flexure point/hinge 1602. Rods and clamps for various mounting systems may be obtained, for example, from Henry Troemner LLC, Thorofare, N.J. 0808 (http://www.talboys.com/labframes_rods.php) and (http://www.talboys.com/clamps_connectors.php).

Layout or surveying of a construction site or structure is typically done, in conventional methods, with a sighting transit and/or strings lines along with diagonal measurements. This can be very time consuming and often requires two people and the frequent relocation of the transit.

In the preferred methods according to the invention, on the other hand, a layout or structure can be quickly defined or measured. See, for example, FIG. 27, which portrays one but not the only method of laying out a building, which includes the elements listed below after their call-out numbers.

500. Laser beam source located at 1st survey point.
1802. Laser beam A.
1803. Laser beam direction indicators.
1804. Distance from 1st survey point to side A of layout.
1805. 90 degree beam splitter located along laser beam A and inline to layout side A.
1806. Distance equal to layout side B.
1807. 90 degree beam splitter located along laser beam A and inline to layout side C.
1808. Continuation of laser beam A.
1809. Laser reflector target located at 2nd survey point.
1810. Distance of layout side B from laser beam A.
1811. Distance of layout side A.
1812. Laser beam B inline with layout side A.
1813. 90 degree beam splitter located along laser beam B and inline to layout side D.
1814. 90 degree beam splitter located along laser beam B and inline to layout side B.
1815. Laser beam C inline with layout side C.
1816. Laser beam intersection form at layout corner C-D.
1817. Laser beam intersection form at layout corner B-C.
1818. Laser beam D inline with layout side D.
1819. Laser beam E inline with layout side B.
1820. Layout side A.
1821. Layout side D.
1822. Layout side C.
1823. Layout side B.

Laser beam source (preferably a laser unit 500) provides a single beam that reaches right angle beam splitters (preferably prism assemblies 1805, 1807, 1813, and 1814 that may be similar to prism assembly 1600) and laser target 1809. The laser would typically be positioned at a first survey point and first aligned to project on the laser target 1809 located at a second survey point. First prism assembly 1805 is positioned at known setback distance 1804 and aligned to direct a fraction of beam 1802 at 90 degrees to the beam entering it, to form beam 1812. A second prism 1807 is positioned at known distance 1806 equal to the length of layout side 1823 and aligned to direct a total or fraction of beam 1802 at 90 degrees to the beam entering it, to form beam 1815. A third prism 1814 is positioned at known setback distance 1810 and aligned to direct a fraction of beam 1812 at 90 degrees to the beam entering it, to form beam 1819. A mark can be placed on the ground directly under the center of the prism 1814 to indicate the layout corner of sides 1820 and 1823. A fourth prism 1813 is positioned at known setback distance 1810 and aligned to direct a total of, or fraction of, beam 1812 at 90 degrees to the beam entering the prism, to form beam 1818. A mark can placed on the ground directly under the center of the prism 1813 to indicate the layout corner of sides 1820, 1821. Laser prisms could be mounted so as to direct the beam vertically above or below grade to create a plumb line.

A laser target can, or a laser target stick, can be used to locate and mark the laser beam intersection 1817 that indicates the layout corner of sides 1822, 1823. Also, a laser target can, or a laser target stick, can be used to locate and mark the laser beam intersection 1816 that indicates the layout corner of sides 1821, 1822.

With an additional prism 1805 located along setback 1804, it could be configured that all corners are defined by the intersection of two laser beams. This would allow for a layout area free of obstacles. This is very useful during excavation when ground survey markers are disturbed or destroyed. Alternatively, a single prism may be used, and the laser unit and targets may be relocated to various locations in the layout, as needed, between steps.

Enhanced Features for Preferred Embodiments

Figure 28:
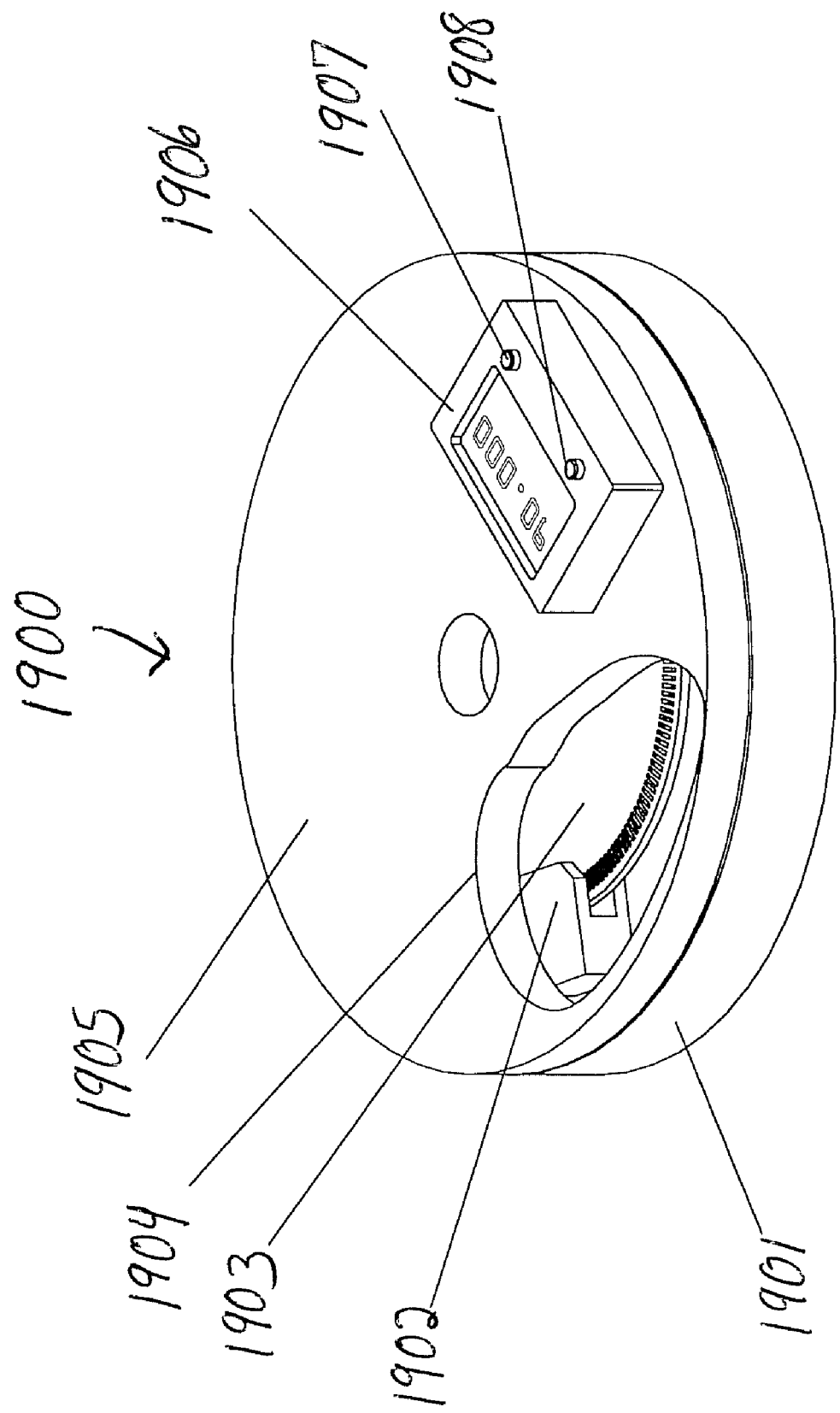
FIG. 28 is a perspective view of one but not the only embodiment of a rotary encoder with readout, which may be used as a rotary joint adjustment system in embodiments of the laser unit.

Referring to FIG. 28: Rotary and Joint Encoder and Readout for Laser Unit:

The laser unit rotary joints may be provided with electronic position encoder and display. One embodiment of such a rotary joint 1900 is shown in FIG. 28, which includes the elements listed below after their call-out numbers.

1901. Rotary Joint Side A ("Half A")
1902. Optical sensor with quadrature output.
1903. Slotted encoder disc attached to joint side A.
1904. Drawing cut-away, revealing internals of the rotary joint.
1905. Rotary joint side B ("Half B").
1906. Battery powered quadrature counter display.
1907. Power/counter reset button.
1908. Readout units (degrees/slope) selector button.

The preferred rotary encoder may be based on one of several technologies, such as optical, resistive, inductive magnetic or capacitive. Rotary encoders and quadrature counter display are known technology, for example, as described in the following U.S. Pat. Nos. 5,142,793; 5,045,691; 4,475,034; and 7,022,975. The rotary encoders and quadrature may be obtained from the following suppliers: BEI Industrial (http://www.beiied.com/main-product.html);

Gurley Precision Instruments (http://www.gpi-encoders.com); Heidenhain (http://www.heidenhain.com/index.php?WCMSGroup 2238_177=479); and/or Red Lion Controls (http://www.redlion.net/Products/DigitalandAnalog/Counters/Totalizing.html).

Referring specifically to FIG. 28, the rotary joint with encoder and readout 1900 comprises two halves 1901 and 1905 that include and enclose the encoder mechanism/electronics for providing the user with a precise numeric indication of absolute or relative position to a user-established zero point. The user zero point is established by positioning it to a desired zero point and then pressing the zero button 1907. The encoder will "measure" and the quadrature counter display 1906 will display an indication of all movement deviating from the zero point. The numerical display units of measure can be selected by pressing the mode switch 1908.

The operation of the rotary encoder and read out may be described as follows. The differential rotation between side "A" (1905) and side "B" (1901) is detected by the rotary encoder consisting of optical sensor 1902 and optical encoder disk 1903, as shown through the cutaway 1904 in the drawing. The display unit 1906 quantifies the rotation movement and direction from the optical sensor.

Figure 29:
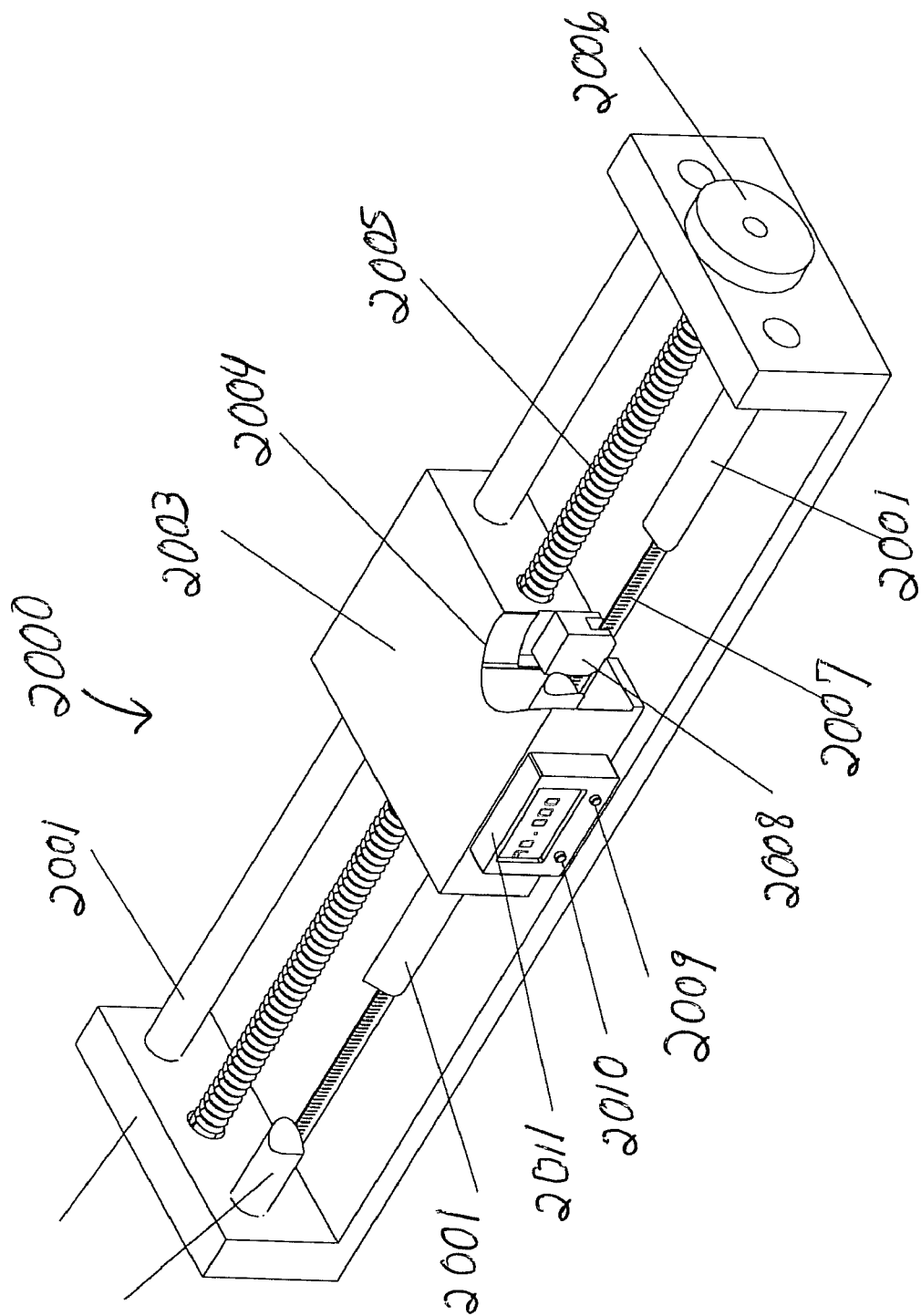
FIG. 29 is a perspective view of one but not the only embodiment of a linear stage encoder with readout, which may be used as a linear adjustment system in embodiments of the laser unit.

Referring to FIG. 29: Linear Joint Encoder and Readout for Laser Unit:

A linear joint encoder and readout system 2000 may be used for adjustments in the preferred laser unit, for example, as portrayed in FIG. 29. The linear joint encoder and readout system may comprise the elements listed below, each element being after its call-out number.
2001. Guide rods.
2002. Carriage base.
2003. Slide carriage.
2004. Drawing cut-away.
2005. Lead screw.
2006. Travel adjustment knob.
2007. Optical encoder strip.
2008. Optical sensor with quadrature output.
2010. Power on/reset button.
2011. Readout units (inches, mm/fractions, decimal) selector button.
2012. Battery powered quadrature counter display.

The linear encoder may be based on one of several technologies such as optical, resistive, inductive, magnetic or capacitive. Linear encoders and quadrature counter display are well known technology as shown in the following U.S. Pat. Nos. 4,631,519; 4,112,295; 7,180,430; 5,563,408; 5,909,283; and 7,470,892. Linear encoders and quadrature counter displays may be obtained from the following suppliers: BEI Industrial (http://www.beiied.com/main-product.html); Gurley Precision Instruments (http://www.gpi-encoders.com); Heidenhain (http://www.heidenhain.com/index.php?WCMSGroup_2238_177=479); Red Lion Controls (http://www.redlion.net/Products/DigitalandAnalog/Counters/Totalizing.html); Kessler-Ellis Products (http://www.kep.com/catalog/ii/index.html).

Referring specifically to FIG. 29, the laser tool linear joint 2000 may comprise mounting base 2002 and travel stage 2003 that houses an electronic linear position encoder system (further described below) and a display 2011, which display 2001 provides the user with a precise numeric indication of absolute or relative position/movement compared to a user-established zero point. The user zero point is established by positioning it to a desired zero point and then pressing the zero button 2009. The display will indicate all movement deviating from the zero point. The numerical display units of measure can be selected by pressing the mode switch 2010.

The differential linear movement between mounting base 2002 and travel stage 2003 is detected by the linear encoder comprising optical sensor 2008 and optical encoder bar 2007, as revealed by cut away 2004. The display unit 2011 quantifies the linear position/movement and direction of movement from the optical sensor. The cutting guide laser target 702 (FIG. 16A) or cutting guide laser target 802 (FIG. 17A) may be comprised of an electronic sensor consisting of an array of photo detectors and LED indicators and or audio output transducers and control circuitry configured to indicate symmetrical laser illumination of either side of a predetermined center point. This would allow the operator to quickly determine that the guide/jig is properly aligned to the laser beam.

Options and Further Enhancements for Preferred Embodiments

The reflective target according to some embodiments of the invention have regions of different reflectivity, for example, a reflective target with concentric markings wherein some of said concentric markings may be of different reflectivity compared to other of said markings.

The laser light source may have, for example, a wavelength between 500-620 nm, and preferably has a modular-type mounting for easy change-out of the laser to other types of lasers. The laser may have a collimating lens. The laser module may have any combination of 45, 90 and 180 degree simultaneous, scanned or selectable beams. The laser may comprise selectable optics and/or a scanning device for spots, line or crosshair, for example, of a target. The laser may comprise a pulsing beam to enhance visual detection. The laser may have a scan device and laser-beam intensity control to cause the appearance of bright spots at predetermined intervals along the scan. A modular laser light source may have multiple lasers that project at different angles. The laser light source and/or electronic sensors and/or displays may have an auto shutoff feature. The laser alignment methods may use apparatus that includes only a single laser beam source and one or more right-angle beam splitters or prisms to process the single laser beam. A laser beam splitter or reflector may be used, wherein the splitter or reflector has an adjustable output angle.

Rotary or linear joints may comprise electronic encoders for measuring angles or distance, both absolute and/or relative to set point, and said rotary and linear joints may have quick-attach features to provide enhanced modularity for the laser unit. The rotary and linear joints may be motorized and may be remotely controlled. Rotary joints may be provided with predetermined stop points, such as 45, 90, 135, 180, 225, 270 & 315 degrees. Also, the motorized rotary joint(s) may precisely sweep between 2 or more predetermined angles. The laser unit and/or its movable joints may contain one or more bubble or electronic levels. The rotary joint(s) may comprise angle markings corresponding to common roof pitches, for example, 4-12. The rotary and linear joints may have seals to keep particle and fluid contaminates out of them. The rotary joints may be provided with a self leveling pendulum, a self-leveling motor, and/or a level sensor.

The preferred cutting guide, which is particularly beneficial for use as a tail cutting jig, may be attached to, and remove from, the member being cut with a single hand. A motorized or pneumatic clamping device may be used to attach the cutting guide to the member being cut. A reference surface, such as a target or reflective edge or portion on the cutting guide, intercepts the laser beam to indicate when the cutting guide is properly aligned with the laser unit, and said reference surface is preferably a reflective surface on the edge of the guide plate. The cutting guide (and the laser unit as well) may comprise a mount with high-friction surface. The cutting guide may have a slot or aperture as an indicator to visually align the cutting guide relative to a chalk-line or pencil-type mark on member to be cut. The cutting guide may have angular markings indicating degrees and common roof pitches such as 4-12, 2-12, etc. The cutting guide may comprise electronic angular sensor and local or remote display. The cutting guide may comprise a level vial or electronic level sensor and display. A cutting guide may include a saw; the cutting guide may comprise a guide channel that mates with an interlocking feature of a saw foot plate. This would ensure that the saw blade always cuts with the same offset and parallel to the guide plate.

The inventors envision that the some embodiments may comprise prismatic film reflective laser targets, which may include electronic feedback. The reflective targets may each include a circular feature that provides increase reflection when centered on laser beam. Targets may include reflective surfaces in the shape of crosshairs and/or circular, and/or may have reflective shapes/portions of different reflective efficiencies. Targets may have a solid portion that reflects or otherwise indicates the laser beam hitting it so that said hitting is visible to the builder, and an alignment hole/aperture that allows laser beam to pass through and continue to the next target or member; this way, when the target is not properly aligned with the laser, the builder can, in effect, see said misalignment, but, when the target is properly aligned with the laser, the builder does not see any laser reflection and, hence, understands that the target is properly aligned. Targets may comprise reflective and non-reflective alignment markings and positioned with same distance offset as the laser beam to one or two surfaces being aligned. Targets may be made of acrylic, polycarbonate, clear plastic, glass, or other materials. Preferably, the reflective targets are inexpensive and disposable, and may be adapted for quick installation by including self-adhesive surface(s).

An optical sighting scope may be included for use along side the laser to aid laser aiming and or marking. A video camera to be used along side laser to aid laser aiming and or marking. Modular attachment device that can be held in place by nailed, screwed, magnetic, vacuum, clamped or hook.

A power supply may be provided as part of the apparatus, said power supply having input adaptors for popular rechargeable power tool batteries used in construction tools.

While it will be understood that the embodiments and examples herein are focused on wood frame construction of buildings, it will be understood by those of skill in the art that the tools and methods of the invention may be used with, or conveniently adapted for, other types of frame construction, such as building frames and roofs that are made of other materials besides wood, for example, metal, polymer, concrete, and composite frame members, including beams, rafters, studs, and other mainly elongated members.

Although this invention has been described above with reference to particular means, materials and embodiments, it is to be understood that the invention is not limited to these disclosed particulars, but extends instead to all equivalents within the broad scope of the following claims.

The invention claimed is:

1. A laser construction tool system comprising:
a laser unit comprising a mount for connecting the laser unit to a first frame construction member, the laser unit further comprising a laser source and multiple rotary joints and multiple linear joints for adjustment of the location of the laser source relative to said first frame construction member and for adjustment of direction of a laser beam emitted from the laser source;
a target separate from the laser unit having a target portion and an attachment portion, wherein the attachment portion is adapted for attachment to a second frame construction member, and wherein the target portion, has a portion that is light-reflective to reflect at least a portion of said laser beam; and
a cutting guide for cutting roof rafter tails of roofs of various pitches, the cutting guide being separate from the laser unit and separate from said target, and said cutting guide comprising a U-shaped bracket and a U-shaped guide plate, wherein the U-shaped bracket has a bracket length and is received on a roof rafter having a rafter length so that the bracket length is parallel to the rafter length, and wherein the U-shaped plate is pivotal and lockable relative to the bracket to be vertical for any roof rafter pitch.

2. A laser construction tool system as in claim 1, wherein said U-shaped guide plate has at least one edge that comprises light-reflective material that reflects the laser beam when said laser beam hits the light-reflective material, for indicating when the cutting guide is aligned with the laser beam.

3. A laser construction tool system as in claim 1, further comprising a prism receiving an incident laser beam from the laser source, wherein the prism splits or redirects the laser beam to travel at an angle to the incident beam.

4. A laser construction tool system comprising:
a laser unit comprising a mount for connecting the laser unit to a first frame construction member, the laser unit further comprising a laser source and multiple rotary joints and multiple linear joints for adjustment of the location of the laser source relative to said first frame construction member and for adjustment of direction of a laser beam emitted from the laser source;
a target separate from the laser unit having a target portion and an attachment portion, wherein the attachment portion is adapted for attachment to a second frame construction member, and wherein the target portion, has a portion that is light-reflective to reflect at least a portion of said laser beam; and
a cutting guide for cutting roof rafter tails of roofs of various pitches, the cutting guide being separate from the laser unit and separate from said target, and said cutting guide comprising a n L-shaped bracket, a first guide plate, and a second guide plate, wherein the L-shaped bracket has a bracket length and is received on a roof rafter having a rafter length so that the bracket length is parallel to the rafter length, wherein each of said first guide plate and said second guide plate is pivotal and lockable relative to the bracket to be vertical for any roof rafter pitch, and wherein both of said first and second guide plates are attached to the bracket on the same side of the bracket and on opposite ends of the bracket.

5. A laser construction tool system as in claim 4, wherein said first and second guide plates each have at least one edge that comprises light-reflective material that reflects the laser beam when said laser beam hits the light-reflective material, for indicating when the cutting guide is aligned with the laser beam.

6. A laser construction tool system as in claim 4, further comprising a prism receiving an incident laser beam from the laser source, wherein the prism splits or redirects the laser beam to travel at an angle to the incident beam.

* * * * *